United States Patent
Cabeza

(10) Patent No.: US 11,656,723 B2
(45) Date of Patent: May 23, 2023

(54) SYSTEMS AND METHODS FOR PROVIDING ON-SCREEN VIRTUAL KEYBOARDS

(71) Applicant: Vizio, Inc., Irvine, CA (US)

(72) Inventor: Kiran Sanjeevan Cabeza, San Francisco, CA (US)

(73) Assignee: Vizio, Inc., Irvine, CA (US)

( * ) Notice: Subject to any disclaimer, the term of this patent is extended or adjusted under 35 U.S.C. 154(b) by 0 days.

(21) Appl. No.: 17/670,490

(22) Filed: Feb. 13, 2022

(65) Prior Publication Data

US 2022/0261113 A1   Aug. 18, 2022

Related U.S. Application Data

(60) Provisional application No. 63/148,946, filed on Feb. 12, 2021.

(51) Int. Cl.

| | |
|---|---|
| *G06F 3/042* | (2006.01) |
| *G06V 40/20* | (2022.01) |
| *G06V 10/74* | (2022.01) |
| *G06F 40/274* | (2020.01) |
| *G06T 7/70* | (2017.01) |

(52) U.S. Cl.
CPC .......... *G06F 3/0426* (2013.01); *G06F 40/274* (2020.01); *G06T 7/70* (2017.01); *G06V 10/74* (2022.01); *G06V 40/20* (2022.01)

(58) Field of Classification Search
CPC ....... G06F 3/0426; G06F 40/274; G06T 7/70; G06V 10/74; G06V 40/20
See application file for complete search history.

(56) References Cited

U.S. PATENT DOCUMENTS 8,902,198 B1 *  12/2014  Karakotsios ............ G06F 3/042
                                                          345/175
8,922,489 B2    12/2014  Chua
                         (Continued)

FOREIGN PATENT DOCUMENTS

CN       105224069 B     3/2019

OTHER PUBLICATIONS

English translation of CN105224069 from Total Patent One.

*Primary Examiner* — Lixi C Simpson
(74) *Attorney, Agent, or Firm* — Hansen IP Law PLLC

(57) ABSTRACT

Systems and methods for providing a virtual keyboard are shown and described. User gestures are captured by a camera and are mapped to spatial coordinates that correspond to the keys of a virtual keyboard. The user defines the coordinate system based on his or her range of motion and also defines the spatial dimensions of the virtual keyboard. The spatial dimensions are then scaled to provide a display image of the virtual keyboard on a TV display. Facial recognition techniques and corresponding data regarding the viewer's anatomy and previously captured reference gestures are used to interpret the viewer's gestures and determine which keystrokes are intended. A character prediction technique using the trajectory of the cursor (i.e., trajectory of entered keystrokes) is combined with language/semantic-based character prediction models to identify a next predicted character that is indicated as the user's selected character, thereby disambiguating the key selection indicated the positioning of his or her fingers relative to the virtual keyboard keys.

14 Claims, 17 Drawing Sheets

(56) References Cited

U.S. PATENT DOCUMENTS

| | | | |
|---|---|---|---|
| 8,928,589 B2* | 1/2015 | Bi | G06F 3/0304 |
| | | | 715/757 |
| 9,201,590 B2* | 12/2015 | Kim | G06F 3/011 |
| 10,635,171 B2 | 4/2020 | Nakamura et al. | |
| 10,698,587 B2 | 6/2020 | Paek et al. | |
| 2012/0274550 A1 | 11/2012 | Campbell et al. | |
| 2012/0295661 A1 | 11/2012 | Kim et al. | |
| 2014/0028567 A1* | 1/2014 | Park | G06F 3/0236 |
| | | | 345/168 |
| 2014/0046922 A1* | 2/2014 | Crook | G06F 16/3326 |
| | | | 707/706 |
| 2018/0290750 A1* | 10/2018 | Pfoertzsch | B64C 39/02 |

\* cited by examiner

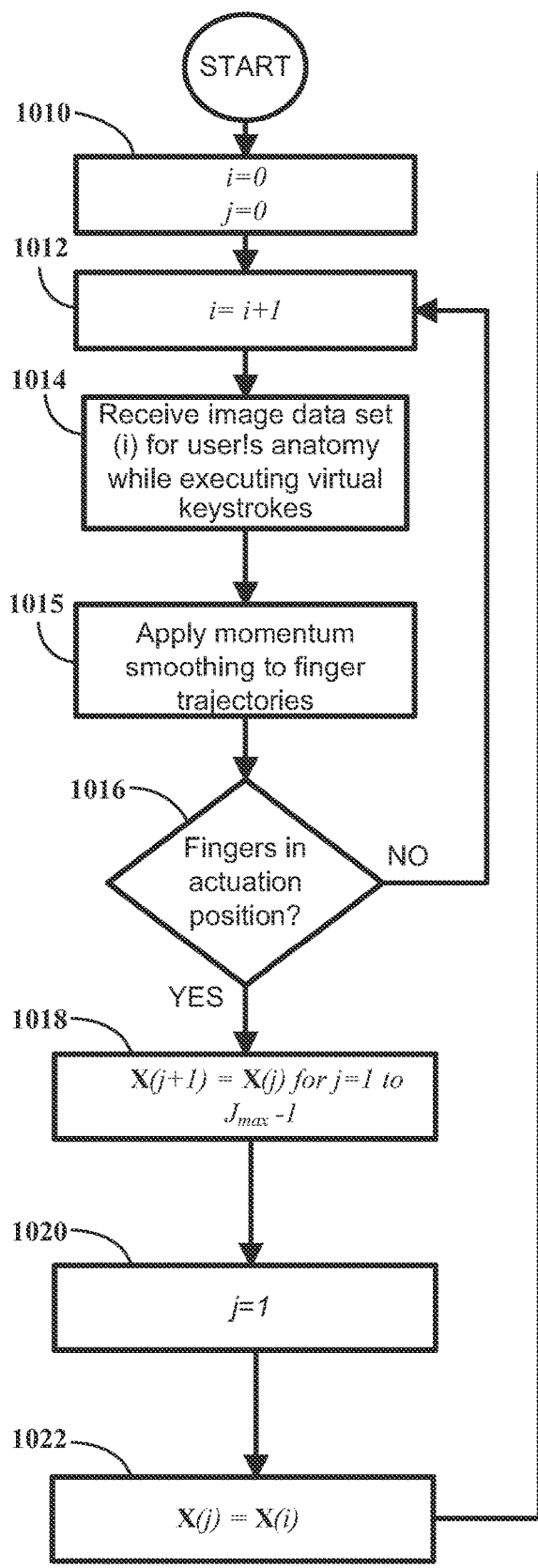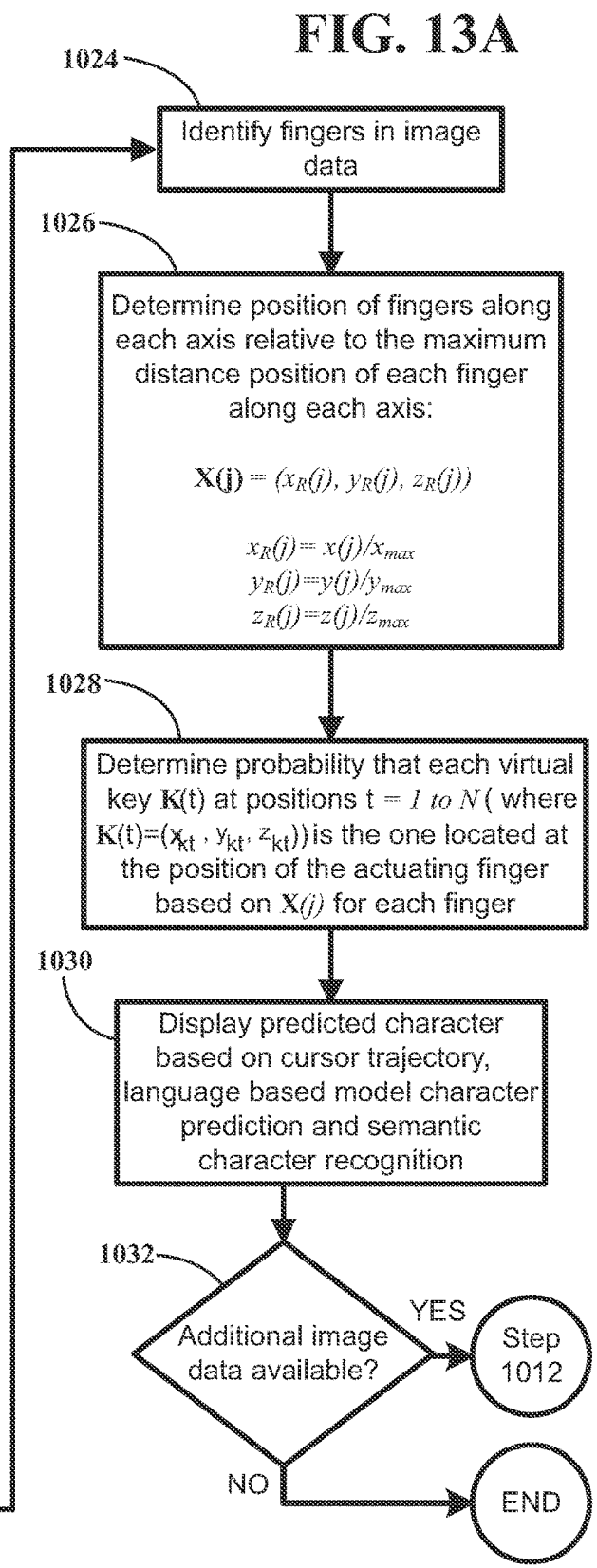
FIG. 13A

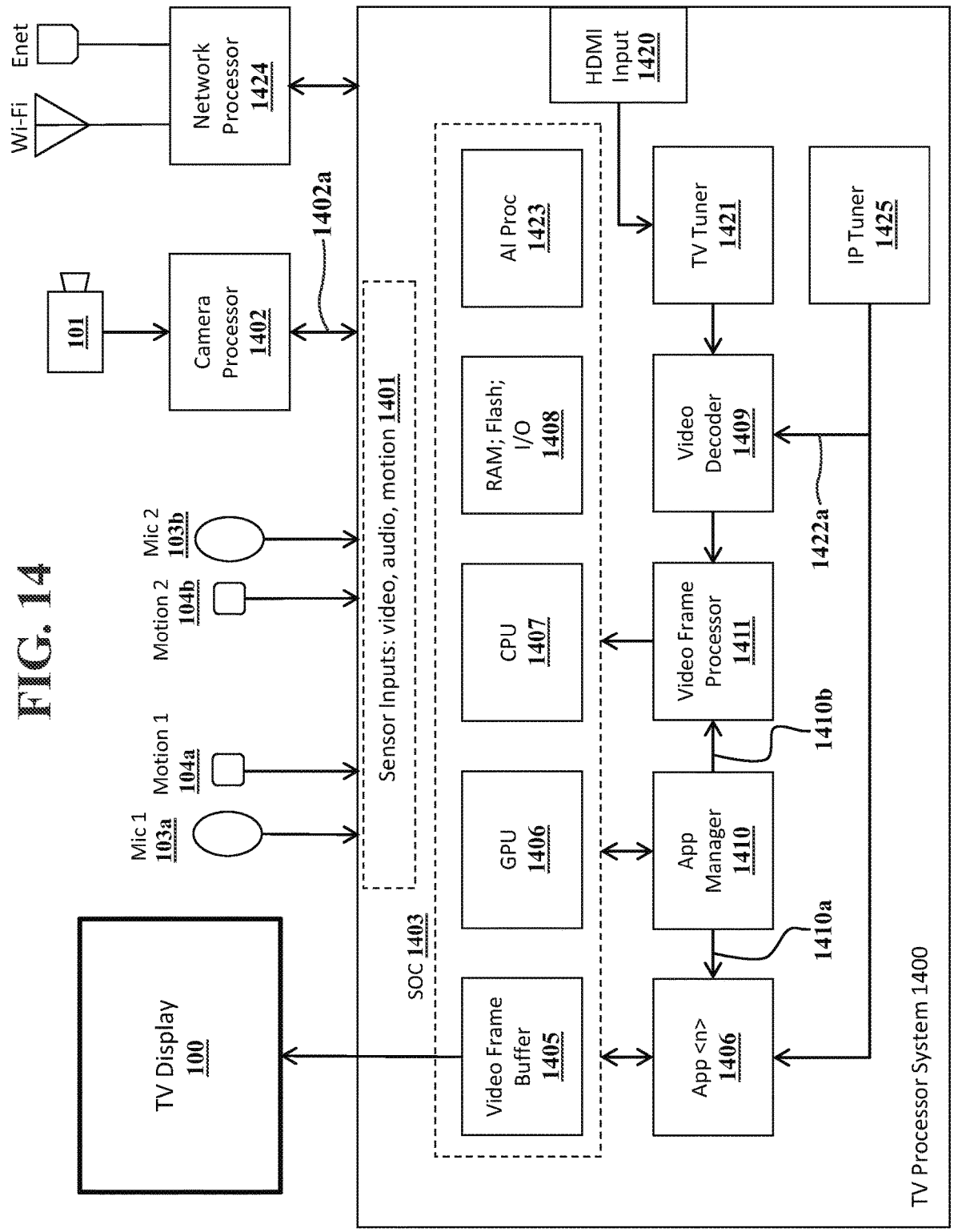

SYSTEMS AND METHODS FOR PROVIDING ON-SCREEN VIRTUAL KEYBOARDS

CROSS-REFERENCE TO RELATED APPLICATIONS

This application claims the benefit of U.S. Provisional Patent Application No. 63/148,946, filed Feb. 12, 2021, the entirety of which is hereby incorporated by reference.

FIELD

The present disclosure relates to virtual keyboards, and more specifically, to techniques for providing increased accuracy and ease of use of virtual keyboards.

BACKGROUND

Over the years, televisions have been equipped with increasingly powerful computer processors and given connectivity to the Internet. The result, known as the smart TV, has largely replaced older style televisions without processing ability. The processing systems of smart TVs typically run software applications, or "apps" as they are known, that come from mobile devices. In parallel with the evolution of the smart TV, the television set-top box has evolved into a device receiving television programming from the Internet adding to the similarly available programming that cable and satellite television provide.

A growing amount of television programming is from on-demand sources allowing the consumer to view content at will from a large libraries of past television series and movies as well as large libraries of made-for-television content. The Internet-delivered sources typically require subscriptions or payment upon viewing, and this requires keyboard entry of a user ID and password. In addition, many so-called "Smart TVs" also provide internet access, which requires text entries to access and engage websites of interest. There are many other apps becoming popular on smart TVs as well as on set-top boxes that require keyboard entry.

Especially in the case of a large television placed at a distance of several feet from the viewer, providing a physical keyboard can be cumbersome, and in some cases, ineffective. While wireless keyboards exist, many of them lack the range required for a television placed at longer distances from the viewer, and in any event, it may be inconvenient to keep a physical keyboard in a living room or family room. So called "virtual keyboards" have been developed in which motion sensors can detect the movement of a viewer's hands and correlate them to keystrokes on a keyboard. However, many known virtual keyboards do not account for anatomical variations in viewers or the variations in their arm and hand movements when executing virtual keystrokes. Nor do they account for the randomness or "jitter" in such movements. Such known virtual keyboards place the virtual keyboard at a fixed location in space relative to the television and use fixed keyboard dimensions, forcing different users to position their fingers in the identical locations in space in order to execute a given key stroke. Also, physical keyboards provide tactile feedback to indicate whether the user is positioning his or her fingers correctly to enter a desired keystroke. Virtual keyboards do not have this feature, and small localization errors are more frequent and can lead to a frustrating user experience.

As such there is a growing need for an improvement of on-screen keyboards for data entry as well as any hand gesture manipulation of on-screen controls.

BRIEF DESCRIPTION OF THE DRAWINGS

FIG. 13A is a flow chart depicting a method of operating a virtual keyboard using a virtual keyboard reference coordinate system that is based on the user's anatomy;

FIG. 14 is a block diagram of the processing system of the smart TV of FIG. 1.

DETAILED DESCRIPTION

The addition of one or more video cameras and microphones to a smart television system enables many useful applications including video conferencing, participating in multi-viewer watch parties, or playing certain games with remote users. However, significant improvements in the speed and ease with which a viewer interacts with software applications (apps) operating on such a system can also be achieved. Using the systems and methods of the embodiments disclosed herein, artificial intelligence technology can be used to process and interpret, in real-time, a person's gestures while in view of the television. Such gesture interpretation can usefully be applied to the process of entering information to an on-screen keyboard, among other application. On-screen keyboards are increasingly commonly employed for, among other things, user logins and passwords.

So-called "virtual keyboards" have been developed in which the user executes gestures in space which are then correlated to keystrokes on an image of a keyboard displayed on a video monitor. Known virtual keyboards typically fix the dimensions of the keyboard at a location in space relative to a video monitor or an associated camera, forcing users to conform their gestures to the fixed virtual keyboard geometry.

In accordance with the present disclosure, several enhancements are provided to improve the ease of use of virtual keyboards. In certain examples, the virtual keyboard's location and dimensions in the space occupied by the viewer are set based on the user's anatomy and with reference to the reach of the user's fingers and thumbs in three-dimensional space. Not only does this technique tailor the keyboard position and dimensions to the user, but it obviates the need to input reference dimensions for the room or the position of the viewer relative to the camera since the coordinate system used to define the virtual keyboard is defined relative to the viewer's anatomy. Open source software useful for identifying body parts from video images can be used to identify the location and trajectory of the user's fingers and thumbs in space relative to the user's anatomical reference point to determine which virtual key is selected. With the use of viewer identifying information, such as user-entered data or facial features recognized by facial recognition software, multiple users of smart TV can each use virtual keyboards customized to their own anatomy.

In addition, it has been discovered that finger trajectory data can be used to identify a set of virtual keys that are most likely to be selected by the user, and thereby, provide next character prediction which enhances and increases the accuracy of character prediction, especially when used in combination with character-based language models and semantic models.

Figure 1:
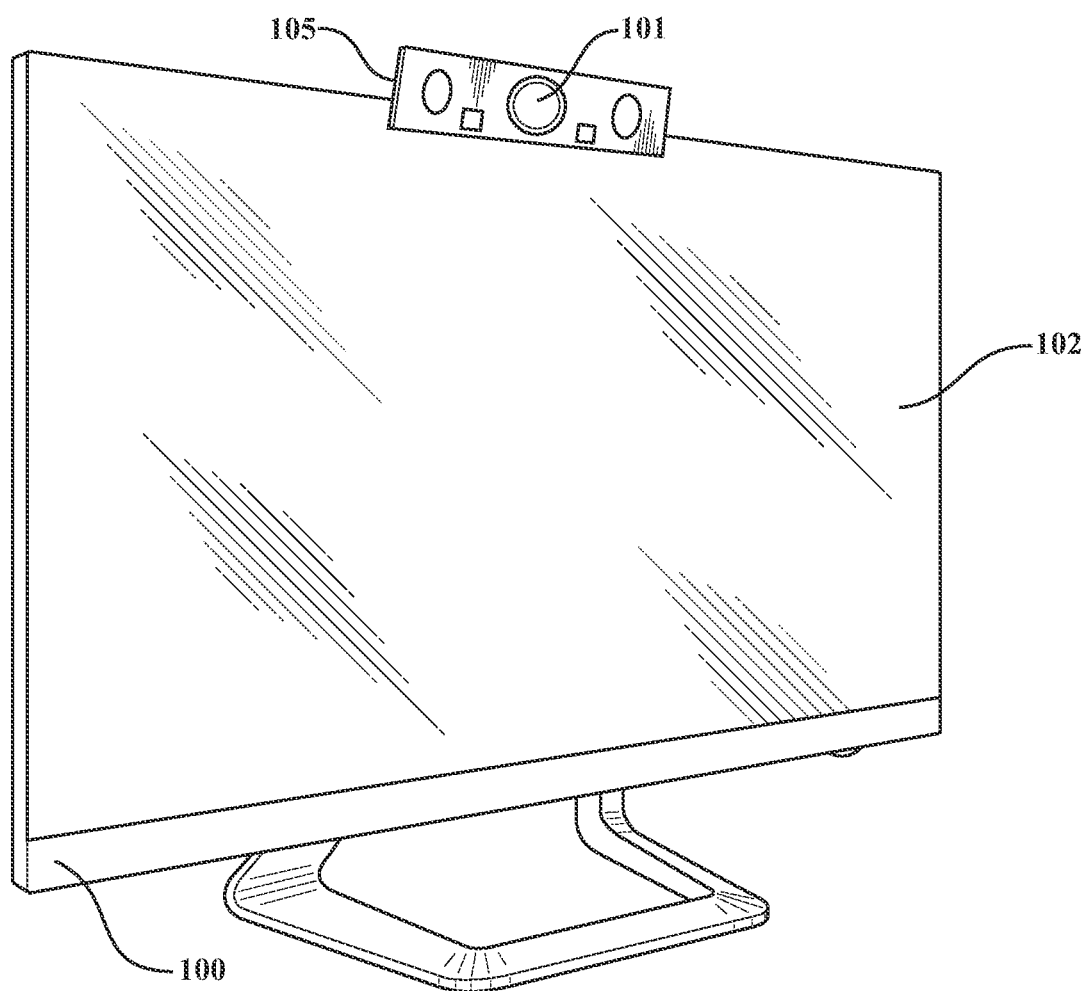
FIG. 1 is a diagram of the primary sensory components of the disclosed system as they might be integrated with a typical television.
Figure 2:
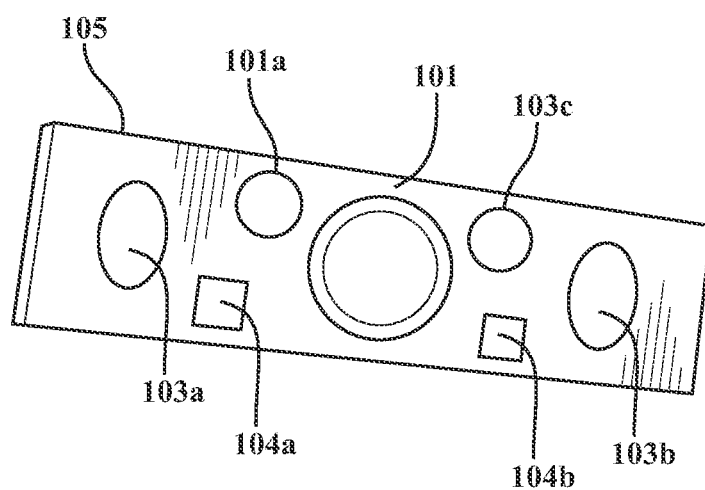
FIG. 2 details the external sensory components of the disclosed system as mounted on an apparatus bar.

In one embodiment, smart TV 100 utilizes a television display 102 with a built-in video camera 101 and microphone system as shown in FIG. 1. Smart TV 100 is provided with an apparatus bar 105 for mounting various sensors. The apparatus bar 105 of the smart TV 100 is further depicted in FIG. 2, showing, in this embodiment, an arrangement of the various sensors including one or more video cameras 101, a camera tally light 101a, a microphone array 103a and 103b, a microphone mute light 103c, a motion sensor array 104a and 104b, and which, in other embodiments, may also contain other supporting technology.

Figure 3:
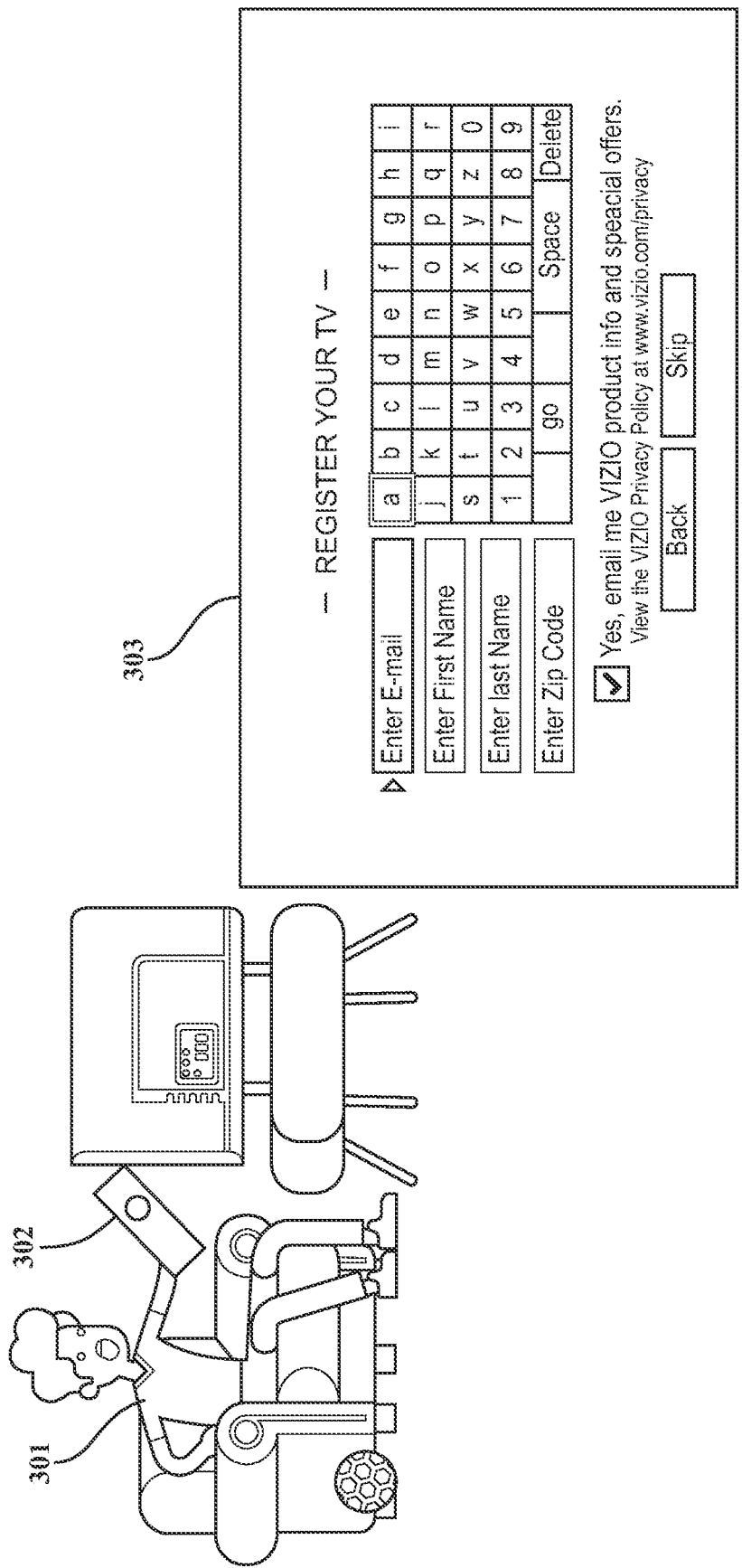
FIG. 3 shows typical configuration of a user on sofa in front of TV using a TV remote to control a typical on-screen keyboard for entering information to a TV app.
Figure 4:
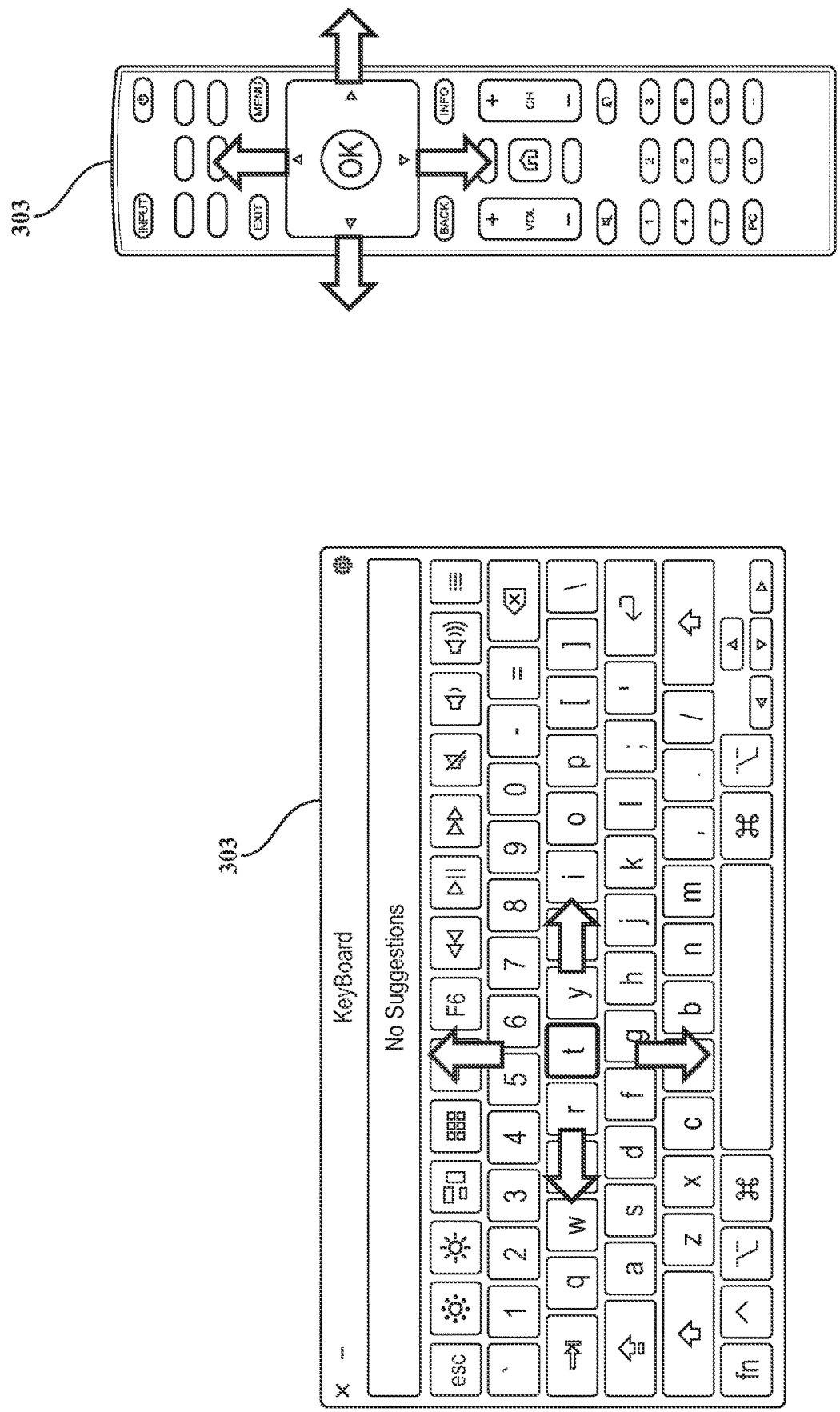
FIG. 4 illustrates a typical on-screen keyboard and TV remote control.

The illustration of FIG. 3 shows a typical scenario encountered when using TV apps that require on screen-menus and keyboards. A user of TV 100 is typically seated six to ten feet from the TV 100 and utilizes the TV remote control 302 to interact with the on-screen keyboard 303 shown on display 102. As further illustrated in FIG. 4, using remote controls for character entry requires the user to navigate to a desired letter, number, or symbol using the up, down, left, and right arrows of the remote control then press an 'Enter' or 'OK' button one character at a time which is a tedious process.

In accordance with the systems and methods described herein, when an on-screen keyboard is required for an application operating on the TV 100, the user 301 can use their hand or hands to type out the information using a "virtual keyboard" as if using a physical keyboard in place of using the aforementioned TV remote control. As used herein the term "virtual keyboard" refers to a set of spatial locations relative to a viewer's anatomy which are mapped to keystrokes. The keystrokes are typically depicted on display screen 102 to provide visual feedback for the keystrokes entered by the viewer.

The methods of providing and operating a virtual keyboard described herein utilize anatomical data of the viewer to provide a reference three-dimensional coordinate system (although 2D coordinate systems can be used if the virtual keyboard is oriented so that it is perpendicular to the ground) that is sized relative an anatomical reference dimension of the user and is positioned relative to an anatomical reference point of the user. In the examples described herein, the anatomical reference point is a point of symmetry between the user's shoulders (with the dimension between the shoulders being referred to as a "shoulder beam"), and the anatomical reference dimension is a length (such as in pixels) from the anatomical reference point to the user's nose. Without wishing to be bound by any theory, it is believed that when normalized to the distance from the center of the shoulder beam to the nose, anatomical dimensions that are significant for purposes of providing virtual keyboards (such as the shoulder beam width and arm length) are relatively consistent across human populations.

Figure 5B:
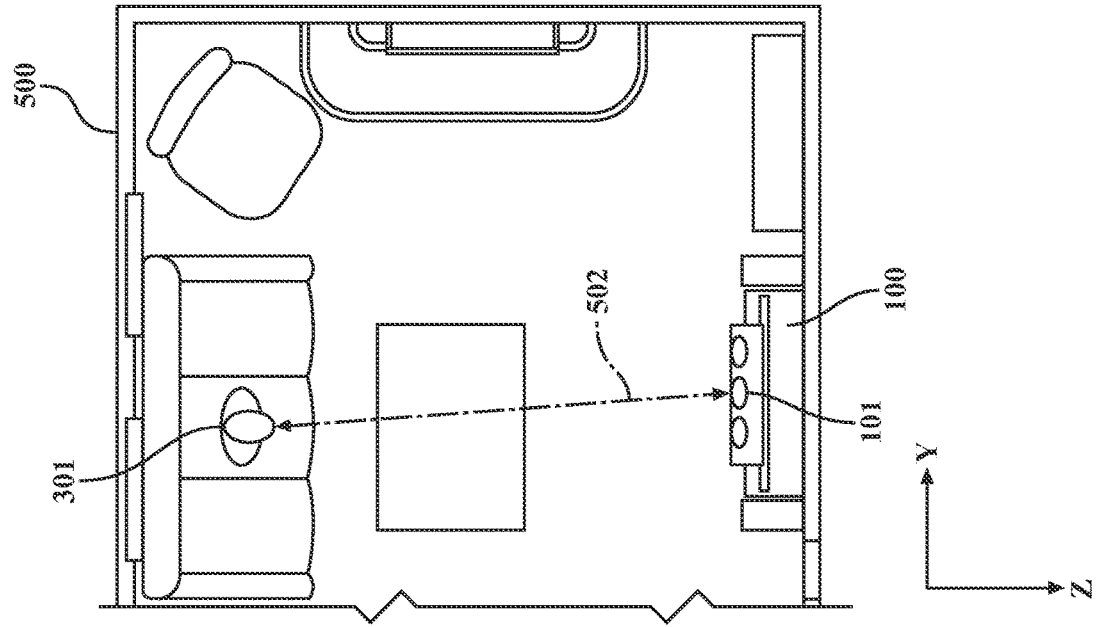
FIG. 5B is a plan view diagram of a TV room showing the relative positions of the viewer to the TV and its sensors used to illustrate an implementation of the method of FIG. 5A.

FIG. 5B depicts a layout of a typical family room 500 with a viewer 301 positioned in in the viewing area of smart TV 100 and within the field of view of video camera 101, which is operatively connected to smart TV 100 such that the video camera 101 can capture and provide video image data to programs and processes comprising smart TV 100. Certain video image data captured by camera 101 (which may be referred to as "anatomical dimension calibration image data") is used to obtain the viewer's scaled anatomical dimensions. In some embodiments, the video camera 101 operatively connected to smart TV 100 can determine an approximate distance 502 from video camera 101 to the viewer 301. However, certain of the examples herein avoid the need for determining this distance in order to provide a virtual keyboard.

In preferred examples, smart TV 100 is configured to store and retrieve viewer anatomical dimensions in association with viewer identity information, thereby enabling smart TV 100 to provide virtual keyboards tailored to the anatomy of individual users. Viewer identity information may be provided in a number of ways, including by having the viewer initially enter text identifying him or herself using a remote control as described previously with respect to FIGS. 3 and 4. However, in preferred examples herein, the viewer identity information comprises facial recognition image data captured by video camera 101.

Referring to FIG. 5B a method of obtaining viewer anatomical dimension is provided. In accordance with the method, the viewer positions himself facing smart TV 100 within the field of view of video camera 101. Step 511. The identity of the viewer 301 is determined, for example, by employing facial recognition algorithms by capturing facial image data and querying an associated viewer database 1508 to obtain viewer identity data that is associated with the captured facial image data. In step 512 this process is initiated by capturing and storing the facial image data in viewer database 1508 (FIG. 16). Upon future use of the system, when the user 301 invokes a TV application that requires keyboard or other manual entry, the facial recognition process will once again scan the face of user 301. Assuming successful identification, the user 301 data will be loaded into the on-screen keyboard application available for immediate use, as will a virtual keyboard developed for him or her during calibration.

Figure 5A:
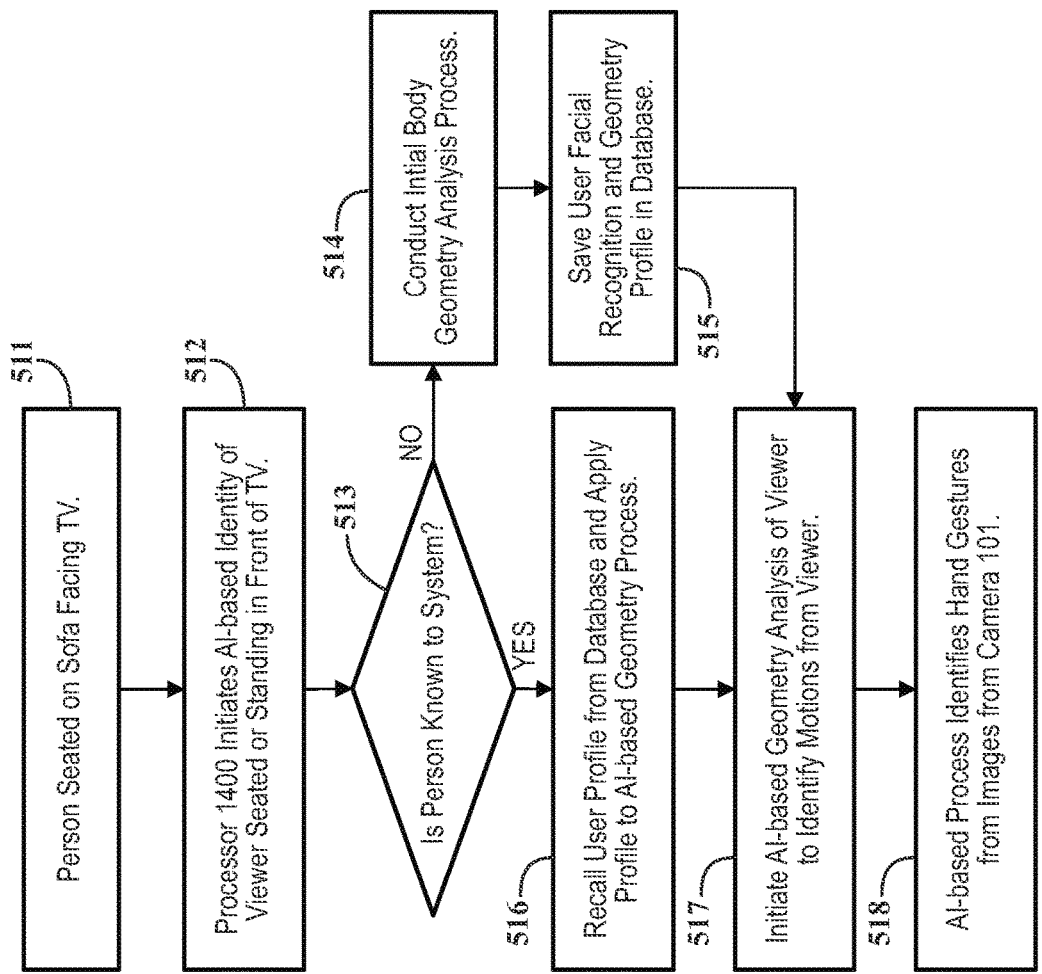
FIG. 5A is a flow-chart of a method of identifying a viewer and providing a virtual keyboard tailored to the viewer's anatomy.

In step 513 the viewer database 1508 is queried to obtain viewer identification data. If the person 301 is included in viewer database 1508, control transfers to step 516 and his or her profile is retrieved from database 1508 so that subsequently captured anatomical image data or viewer gesture data can be stored in viewer database 1508 in association with the retrieved viewer identification data. It should be noted that the viewer database 1508 may comprise several linked databases and is not limited to a single file or particular file structure as long as the viewer identification data can be linked to facial image data or the other types of viewer image data described herein. In the method of FIG. 5A, if the viewer database 1508 does not include a record with database facial image data matching the facial image data captured in step 512, control transfers to step 514, and an enrollment process is commenced.

The enrollment process comprises steps 514 and 515. In step 514, camera 101 captures anatomical dimension calibration image data of viewer 301. This calibration image data includes image data for the viewer's head, arms, hands, and torso. The anatomical dimension calibration image data is then stored in a database record in viewer database 1508 in association with the facial image data captured in step 512.

The viewer anatomical dimension calibration process continues in step 517. Instructions are displayed on TV screen 102 directing the viewer to place his or her arms or hands in various positions such as the position shown in FIG. 6. In order to determine the scaled anatomical dimensions, the image data must be analyzed to identify the anatomical features (arms, hands, fingers, shoulders) used to perform the calculations. In certain preferred examples, this process is carried out using anatomical identification programs. Pose Estimation and Gesture Recognition are well known machine learning processes both representative of rapid advances in artificial intelligence (AI). One suitable program is "MediaPipe", a Google open-source framework for building multimodal (e.g., video, audio, or any time series data), cross-platform (e.g., Android, IOS, web, edge devices) applied machine learning pipelines. In examples herein, MediaPipe is used as a Python-language API to Google's open source "BodyPix machine-learning (ML) application" which provides pre-trained ML models for identifying aspects of the human anatomy in image data (https://github.com/tensorflow/tfjs-models/tree/master/body-pix). BodyPix runs on the "TensorFlow" framework (https://www.tensorflow.org/install). In preferred examples, these programs are used to provide a trainable model for identifying a viewer's hands, fingers, thumbs, and other key anatomical features from image data.

Images of the viewer's face are saved in the viewer preferences database 1508 along with the captured anatomical dimension calibration image data. Step 515. The calibration process then commences to measure the relative dimensions of key points on the body of user 301 by normalizing the dimension to the anatomical reference dimension. In step 518 viewer gestures, such as "air typing" on an imaginary keyboard, are captured by camera 101 and are interpreted based on the stored gesture and anatomical measurement data.

Figure 6:
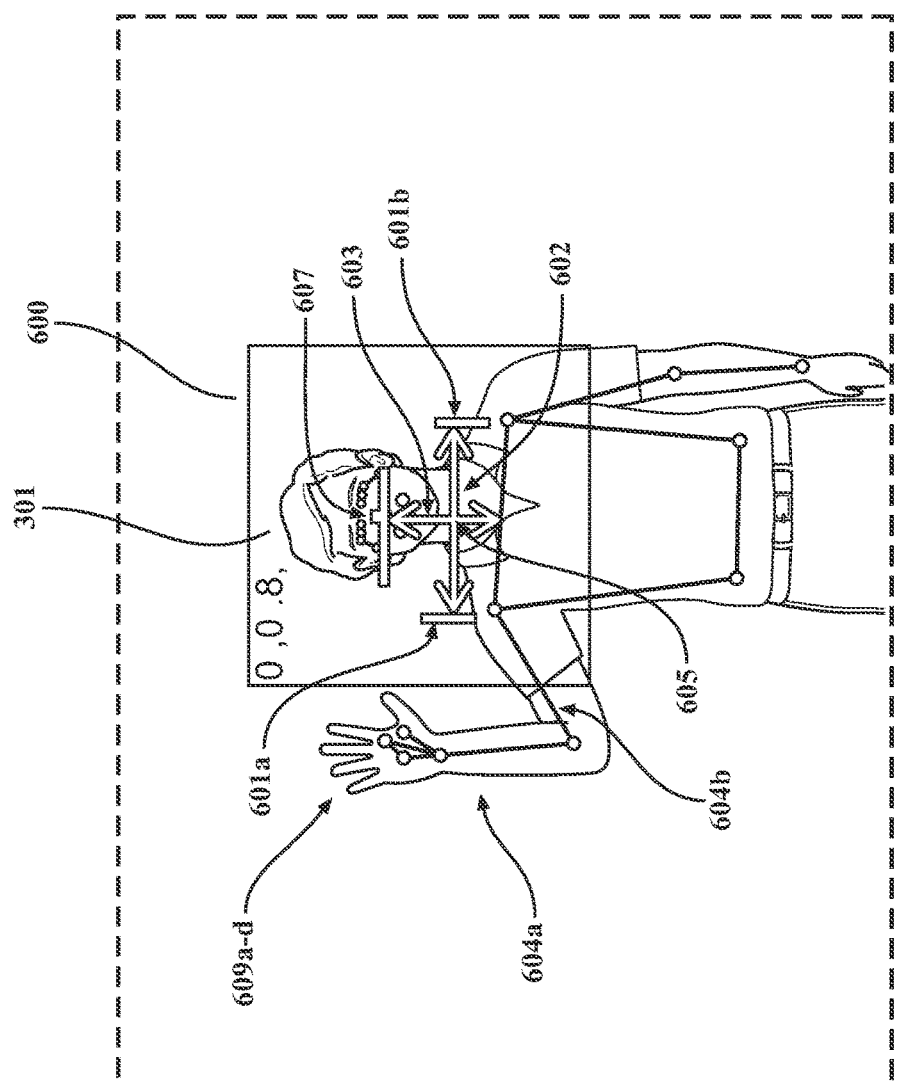
FIG. 6 is a graphic diagram illustrating the determination of a viewer's anatomical reference dimension and anatomical reference point used in defining virtual key positions and user extremity positions.

With attention directed to FIG. 6, an anatomical dimension calibration image 600 captured by video camera 101 is shown. The data is presented to image analysis algorithms that first bound the upper torso of the subject 301. The next step is to isolate the shoulder points 601a and 601b, forearm 604a, nose 607, fingers 609a-d and thumb 613.

As described further below, the anatomical calibration process further comprises determining the mid-point 605 of the shoulder beam defined between shoulder points 601a and 601b. In preferred examples herein, the mid-point 605 is used as an anatomical reference point that serves as an origin for a coordinate system used to track the positions of a user's fingers and thumb as well as the positions of virtual keys comprising a virtual keyboard. Scaled (relative) anatomical dimensions are calculated by dividing the dimension of interest by a reference anatomical dimension, which in the case of FIG. 6 is the distance from the shoulder beam centerpoint 605 to the nose 607. Prior to scaling, the dimensions are measured without reference to an external unit of measurement and are instead determined by the image data itself. For example, the dimensions may be measured using numbers of pixels without regard to the size of the pixels on any particular display. The scaled anatomical dimensions are then unitless. Arm length may be calculated by adding the forearm 604a and upper arm 604b length. Additional steps then map fingers to the forearm geometry.

The relative anatomical dimension data that is generated is stored in a record of viewer database 1508 which includes a viewer identity field with data that identifies the corresponding viewer. In some embodiments, a facial recognition process is employed also utilizing the video camera 101 of the TV 100 to form a visual identification of the user 301 such that the person need not enroll with the on-screen keyboard system for future uses. In some embodiments, with the data acquired from both enrollment and the process used to determine the distance to the user 301, the disclosed system can accurately determine movement of the user 301 hands and fingers and further interpret hand gestures without the need for a multiple camera signal to generate a three-dimension image projection.

In one embodiment, the disclosed system interprets hand (including finger/thumb) gestures and positions in space which are mapped to an on-screen keyboard. The foundation for the gesture interpretation process is based on Pose Estimation and Gesture Recognition process described earlier. In accordance with the embodiment, camera 101 captures calibration image data that includes images of the user extending the arm and fingers out at least vertically and horizontally (i.e., along the x and y axes). These images will define the user's range of motion, which may differ from his or her actual full range of motion and can be set by the user to something more comfortable by selecting how much he or she extends the arms and hands in each direction. Camera 101 captures the distance of the fingers and thumb in these "maximum distance positions". The distances are then scaled to the anatomical reference dimension and then define a reference location on each axis at which $x=x_{max}$ and $y=y_{max}$. From this information and the scaled anatomical dimensions (e.g., upper arm and forearm), a maximum distance position can be obtained along the z-axis that runs orthogonal to the camera. The maximum distance positions ($x_{max}$, $y_{max}$, $z_{max}$) along each axis are used to define a fixed point on each axis, such as 1.0 dimensionless units.

Figure 7A:
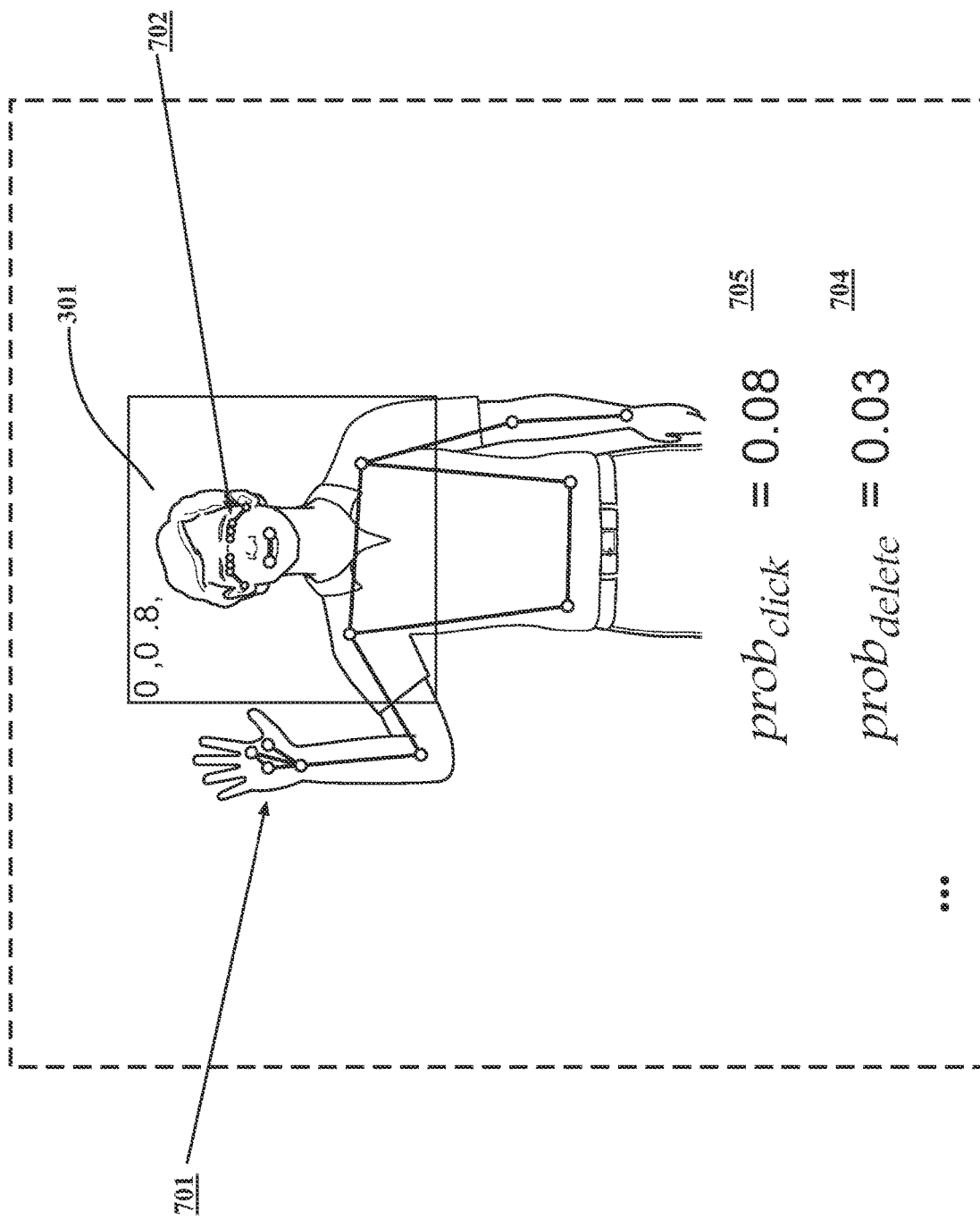
FIG. 7A is a graphic diagram illustrating a machine learning system for determining the location of parts of the human anatomy in an image.
Figure 7B:
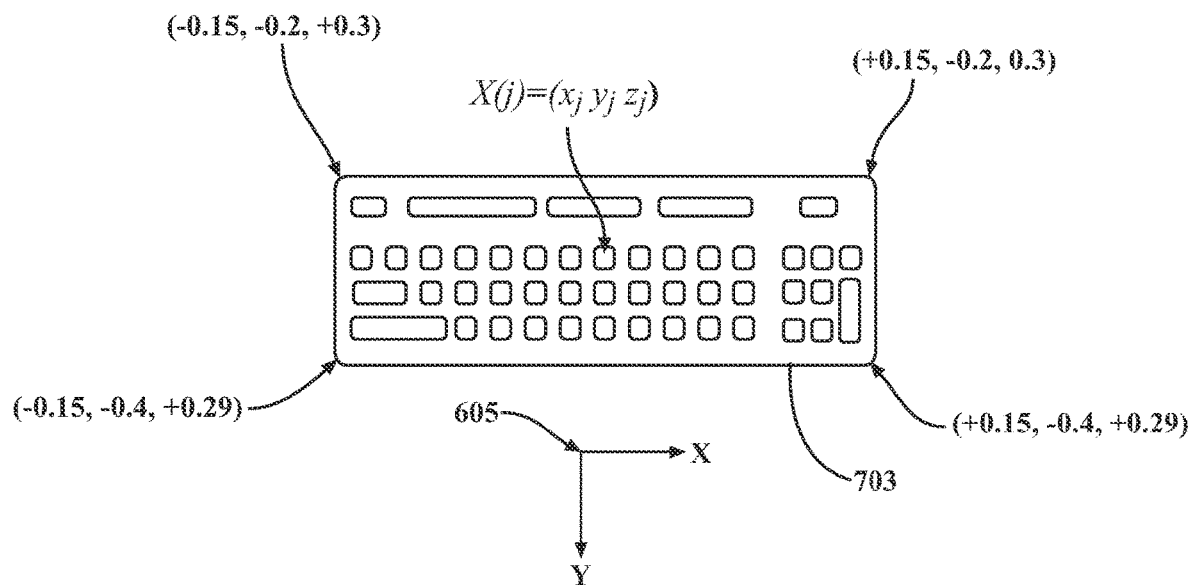
FIG. 7B is a schematic depiction of a virtual keyboard showing the coordinates of four reference points used to spatially locate virtual keys in space.

The foregoing process is schematically illustrated in FIGS. 7A and 7B. In FIG. 7A, a coordinate system origin is set at the shoulder beam midpoint 605 and has coordinates (0,0,0). The user is directed (by on-screen instructions) to select keyboard reference points in space which the system will then use to define the spatial locations of the reference points. The user may do this, for example, by holding a finger of one hand at one point in space for each corner. The TV 100 will display an image of a keyboard during this process so the user can tell which reference points the gestures are defining. Once the keyboard reference coordinates are determined the image of the keyboard on the display may be used to locate the spatial coordinates of each virtual key by scaling the distances of the keys from the corners in space based on the corresponding distances in the displayed keyboard image.

The coordinates in each of the x, y, and z dimensions are all relative to the scaled maximum distance position along the respective x, y, or z axis of the user's fingers (i.e., $x_{max}$, $y_{max}$, $z_{max}$). For example, a user will be instructed via display 102 to select a location in space that will correspond to the upper left-hand corner of virtual keyboard 703. The selected coordinates are x=−0.15, y=−0.2, and z=+0.3, which means that the upper left-hand corner is located along the x axis 15 percent of the distance from shoulder beam center 605 to the farthest fingertip when the left arm and hand are in their full range motion calibration position (i.e., 15 percent of $x_{max}$). The upper left-hand corner is located 20 percent of the distance from the shoulder beam center point 605 to the farthest fingertip when the user's left arm and hand are in the full range motion calibration position along the y-axis (i.e., 20 percent of $y_{max}$), and 30 percent of the distance from shoulder beam center point 605 to the farthest fingertip when the left arm and hand are in the full range motion calibration position along the z-axis (i.e., 30 percent of $z_{max}$). As indicated in FIG. 7A, the user selects locations in space that define x, y, and z coordinates for all four corners of the virtual keyboard 703 respectively.

Figure 7C:
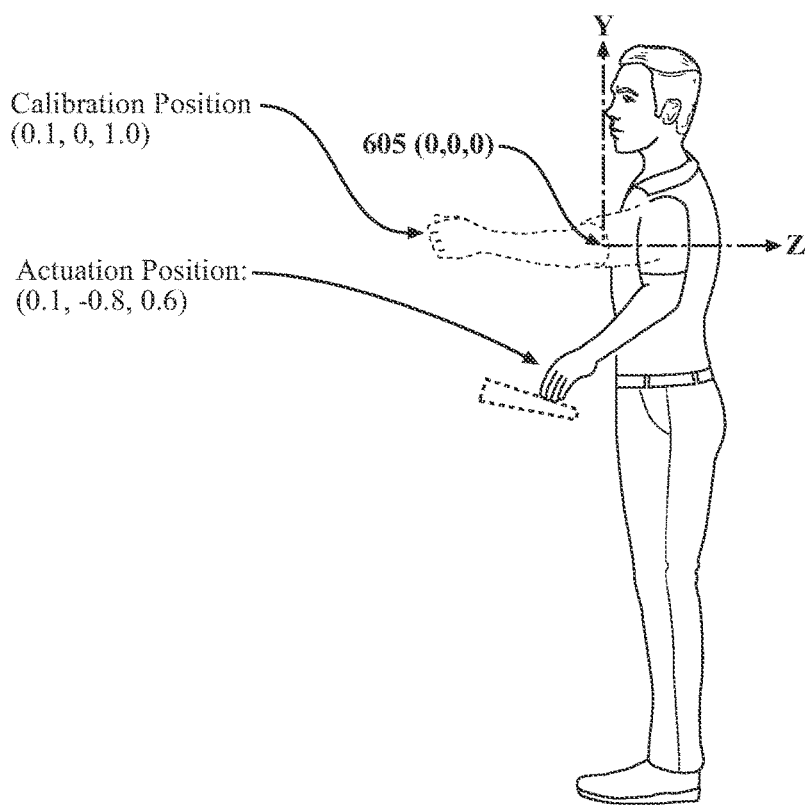
FIG. 7C is an illustration of a person typing on a virtual keyboard used to illustrate the use of a coordinate system based on the viewer's anatomy.
Figure 12:
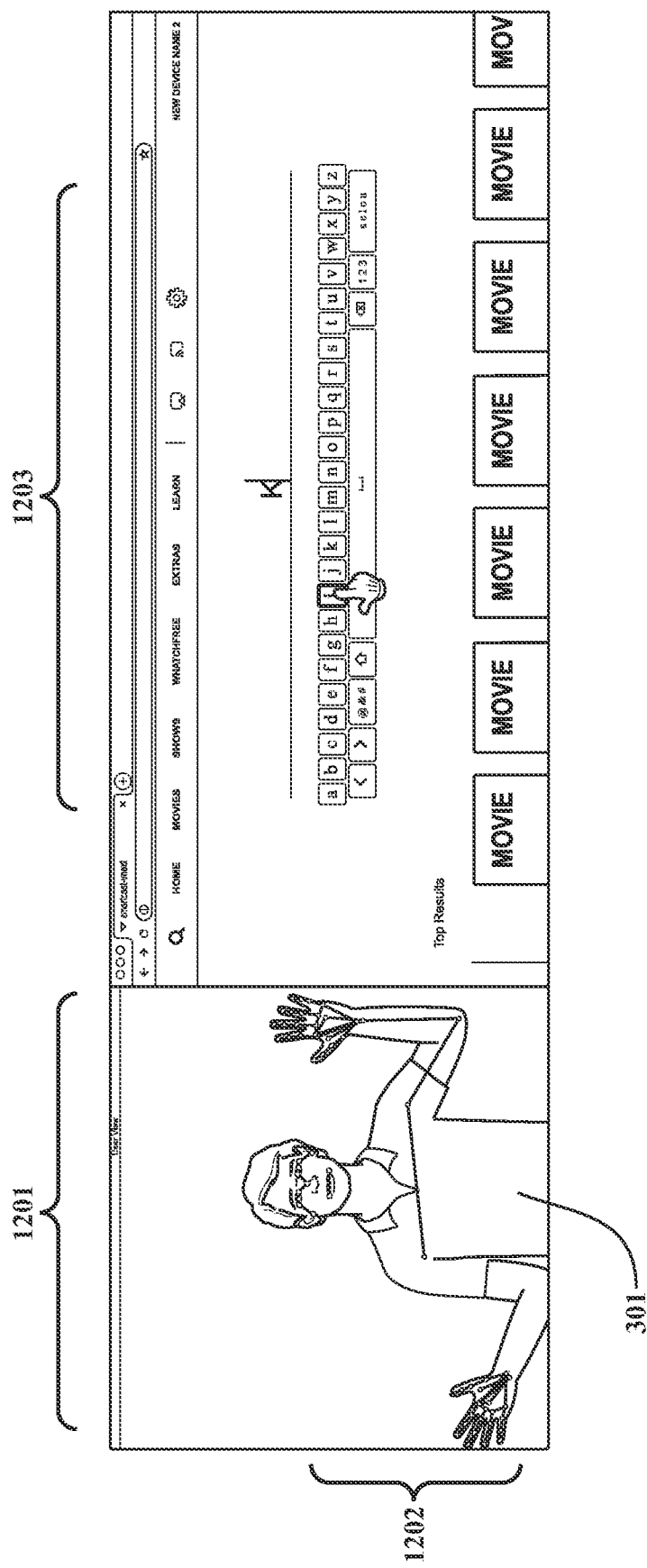
FIG. 12 illustrates the proportional scaling of a user's range of motion to any given size displayed keyboard image.

FIG. 7B depicts a user using virtual keyboard 703, and FIG. 7C shows his or her arm in a z-axis full range of motion calibration position for comparison. It should be understood that there is no physical keyboard at the location of virtual keyboard 703 in the figures. The virtual keyboard 703 is simply a spatial volume in which spatial coordinates correspond to the keys of a display image of a keyboard on display 102. The user's arm is shown in phantom in the z-axis calibration position, which is also referred to as a "maximum distance position" in which the arm, fingers, and thumb are extended to the full range of motion calibration position along the z-axis. In this position the fingers are at the position along the z-axis at which z=$z_{max}$. Because fingers have different length, $z_{max}$ is set based on the fingertip that is furthest from shoulder beam center point 605 along the z-axis. Where the fingers of the right and left hands have different distances from the shoulder beam center point when outstretched along a given axis, the finger that is furthest from the shoulder beam center point 605 will be used to set the maximum distance along that axis for both hands. In the actuation position of FIG. 7B, the actuating finger is only at 60 percent of $z_{max}$, 80 percent of $y_{max}$ and 10 percent of $x_{max}$. Using the foregoing techniques tailors the keyboard position and dimensions to the user's anatomy. The benefits of this tailoring process are illustrated in FIG. 12. The user's x-axis (horizontal) range of motion 1201 and y-axis (vertical) range of motion 1202 are shown. In the drawings, the keypad dimensions and the user's horizontal range of motion are such that the user can execute keystrokes along a horizontal keyboard dimension 1203 that is greater in length than the user's horizontal range of motion, and can maintain the same range of motion even if the displayed keyboard dimensions change. Thus, the user does not have to adjust his or her position to compensate for his or her range of motion relative to the dimensions of the keyboard displayed on the display 102.

As explained previously, using Pose Estimation and Gesture Recognition the positions of a user's fingers and thumb can be captured and recorded in real time to determine which keys the user is trying to select. This captured data may be referred to as "keystroke motion vector data" and is normalized based on the maximum distance position ($x_{max}$, $y_{max}$, $z_{max}$) of the fingers and thumb along each axis to yield normalized keystroke motion vector data. As part of this process, it is determined whether the hands are in a resting position such that keyboard actuation is likely, and the resting image data is analyzed for the purpose of determining which virtual keys are selected.

The finger/thumb spatial coordinate position data from this process can exhibit significant noise due to "jitter." If jitter is significant, it can cause difficulty in consistently and repeatedly identifying the key the user is trying to select. Thus, in certain examples, image data received from camera 101 is momentum-smoothed to reduce the jitter both during calibration and in actual use of the virtual keyboard.

Figure 8:
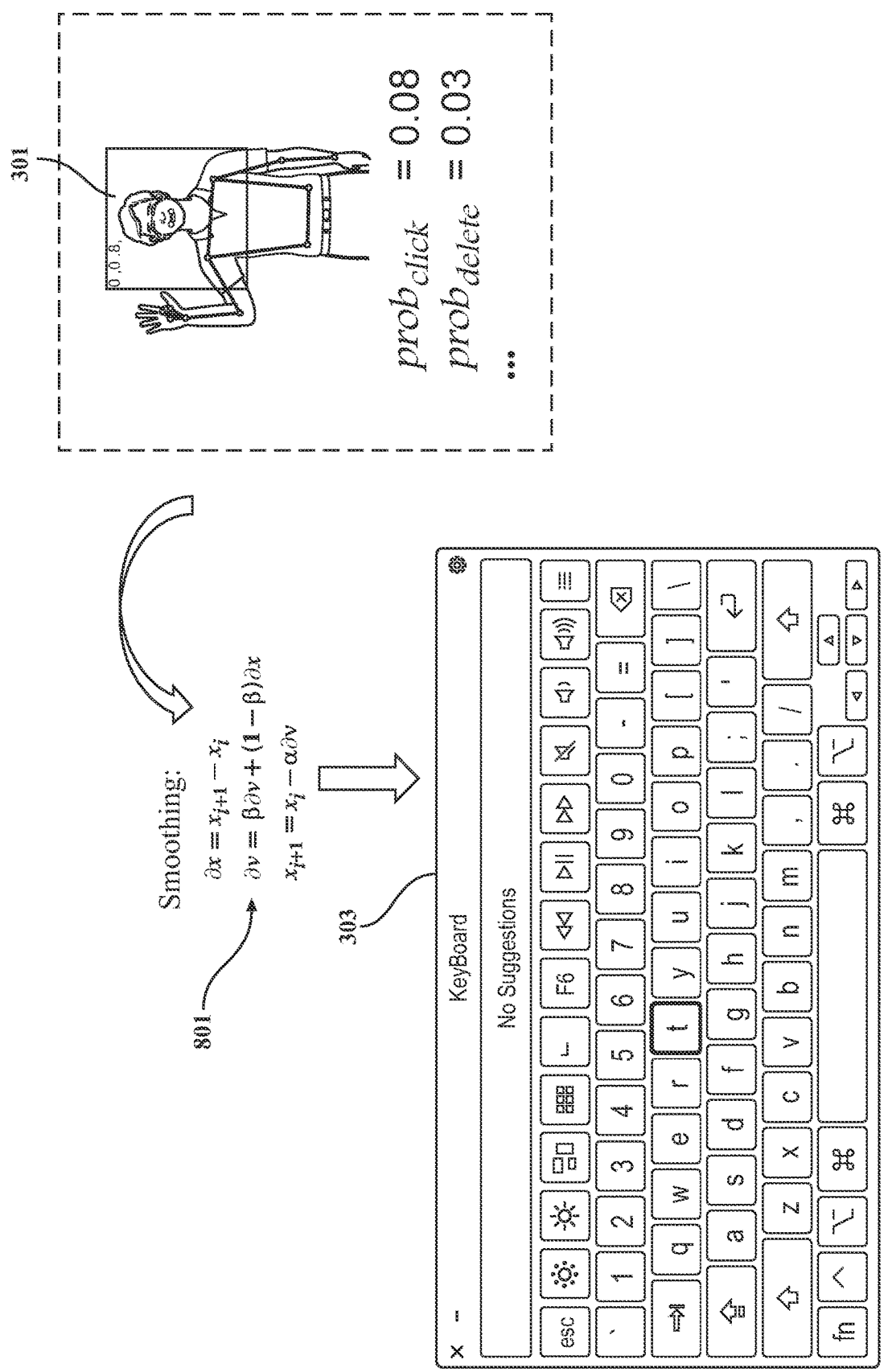
FIG. 8 is an illustration of a method of obtaining momentum-smoothed hand, finger, and thumb position and velocity data.

FIG. 8 illustrates the process of capturing image data, identifying finger and thumb position data and smoothing the thumb and position data in smoothing process 901 to identify the key (the letter "t", FIG. 8) over which the currently actuating finger (or thumb) is positioned. Keyboard 303 is an image of a keyboard appearing on the TV display 102 and indicating the virtual key over which the actuating finger is located. The currently actuating finger (or thumb) is determined by analyzing the relative positions of the fingertips and the thumb in captured image data using Pose Estimation and Gesture Recognition as described above.

A variety of techniques are available which may be used for momentum smoothing. However, in certain examples, a variant of a hidden Markov filter is used. As the fingers and thumb move during keyboard actuation operations, their positions in x, y, and z in are recorded. Using the frequency of data recordation, velocities along each axis can be calculated. Thus, position data for the fingers and thumb is in the form of a three-dimensional vector $\vec{X}$, and the velocity data is in the form of a three-dimensional velocity vector $\vec{V}$, (as velocity and displacement are vector quantities the term "vector" here refers to one-dimensional array). The smoothing is carried out in accordance with the following relationships:

$$\partial \vec{X} = \vec{X}_i - \vec{X}_{i+1} \tag{1}$$

$$\partial \vec{V} = \beta \partial \vec{V} + (1-\beta)\partial \vec{X} \tag{2}$$

$$\vec{X}_{i+1} = \vec{X}_i - \alpha \partial \vec{V} \tag{3}$$

wherein, $\vec{x}$ =displacement vector (x, y, z) for the displacement of the extremity from user's anatomical reference point relative to the reference anatomical dimension along the corresponding axis;

$\vec{V}$ =velocity vector $(v_x, v_y, v_z)$;

β=inertial weight (scalar, dimensionless) used to simulate the inertia of an arm and hand;

α=exponential smoothing value (scalar, dimensionless); and i=dimensionless index value for data points i=1 to a maximum value, $i_{max}$.

Figure 9C:
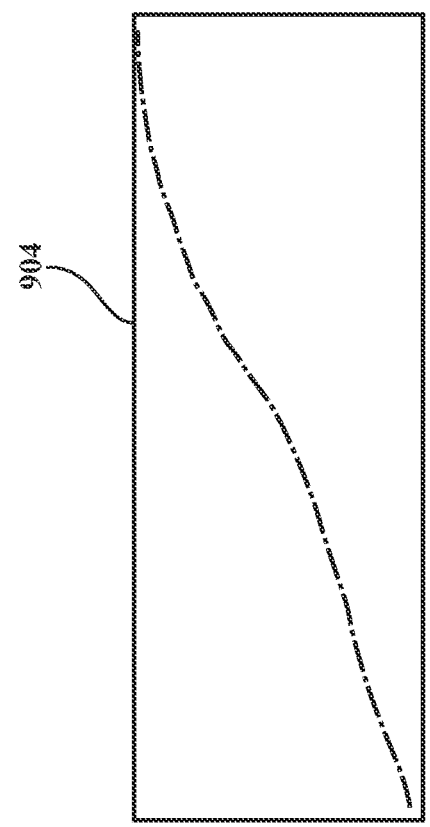
FIGS. 9B-9C show the before and after plots of the cursor movement data.
Figure 9B:
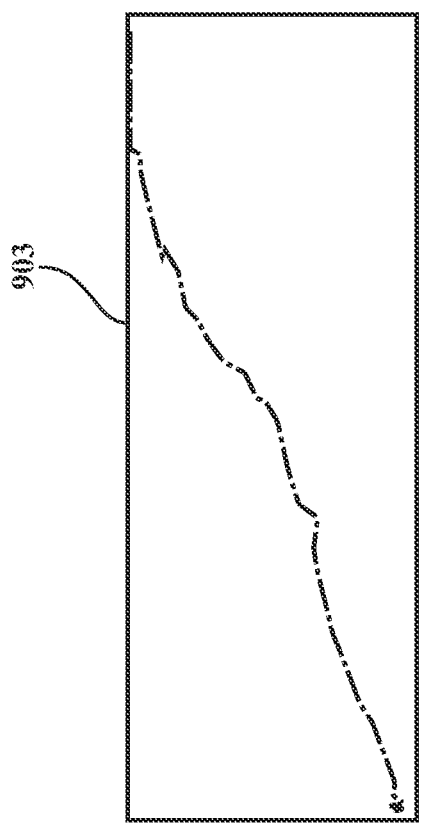
Figure 9A:
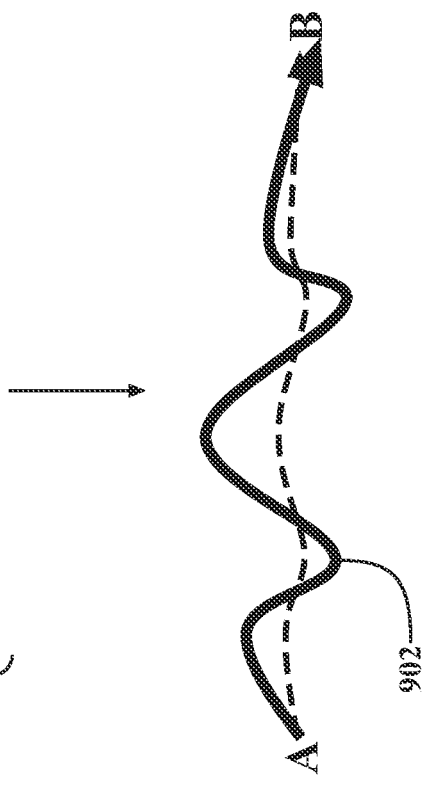
FIG. 9A shows the formula and the plotted graph for a process of momentum-smoothing of hand coordinates.

It should be noted that vectors are represented herein using a capital letter with a right-facing half arrow overscore (e.g., $\vec{x}$) and using a bolded capital letter X. Thus, for purposes of simulating human hand and finger movements, the value of β is generally from about 0.1 to about 0.3, preferably from about 0.15 to about 0.25, and more preferably from about 0.18 to about 0.22. The value of a is generally from about 0.5 to about 0.8, preferably about from about 0.60 to about 0.76, and more preferably from about 0.66 to about 0.70. Exemplary Momentum-smoothing process 901 provides both data smoothing and the introduction of inertia through exponential decay such that the resulting estimation of the key pointed to by the user maps to the user's intention and is stable. The algorithm and a graph of its input/output signal is illustrated in FIG. 9A. Data from actual use is plotted in FIG. 9B where plot 903 depicts the raw data output of the hand/finger tracking process, and plot 904 represents the same data after processing by the momentum-smoothing process 901.

Figure 10:
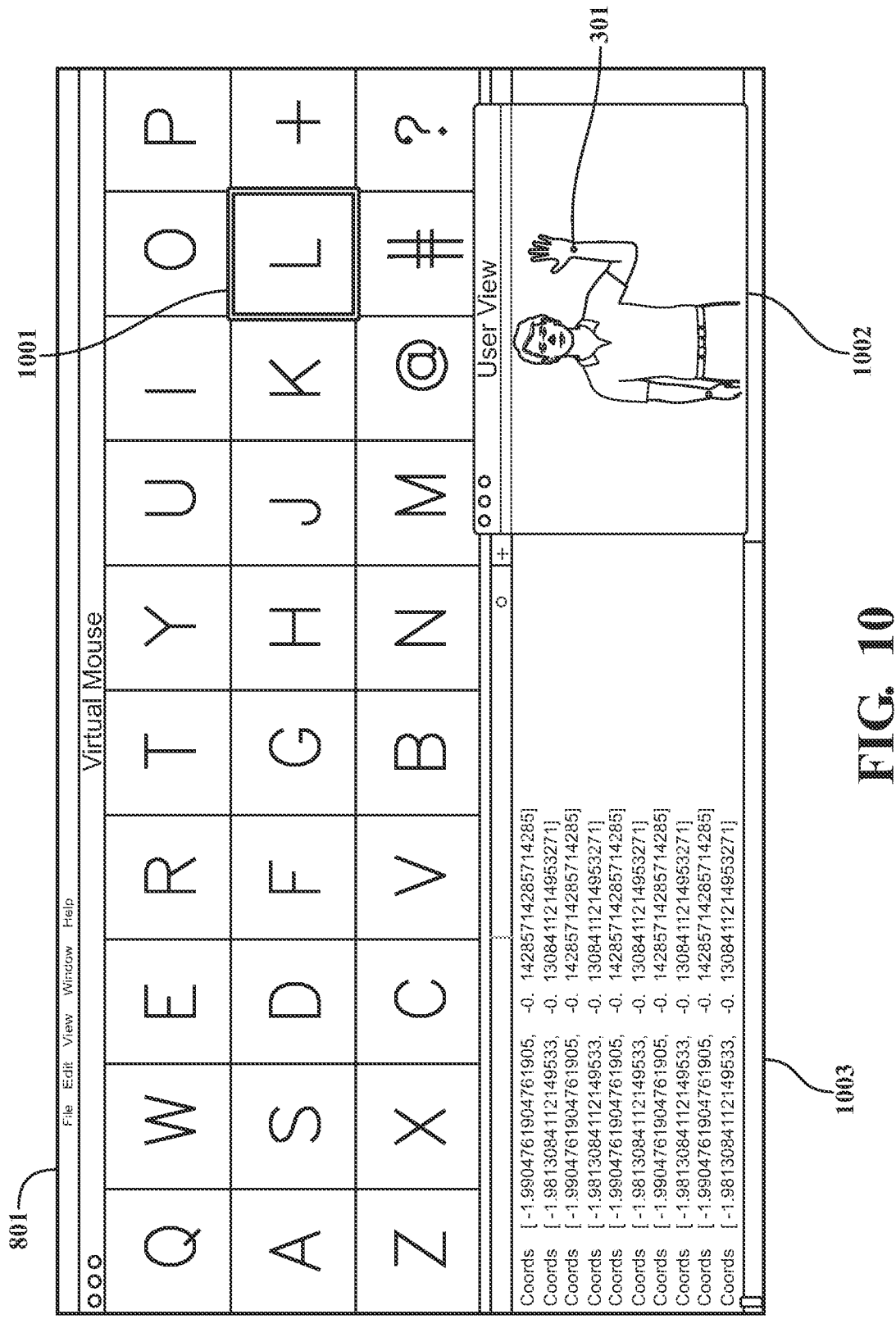
FIG. 10 shows the on-screen keyboard with a key selected using the methods of providing a virtual keyboard described herein.

With attention directed to FIG. 10, it can be seen on the on-screen keyboard 801 a highlighted box 1001 is surrounding the user 301 key choice. The user 301 hand position has been interpreted and displayed by the on-screen keyboard 801 process using AI-based image recognition employing gesture and other analysis to determine the highlighted key 1001 choice. The data output 1003 is representative of the unscaled, continuous data output of the Pose Estimation and Gesture Recognition process as the user 301 moves the hand and fingers. Data output 1003 comprises a series of unscaled x, y coordinates (the virtual keyboard is vertical and has no z-component in this example). In the example of FIG. 10, the smart TV 100 predicts the key that the user is about to depress by determining which key has spatial coordinates that intersect with the spatial coordinates of the actuating finger.

When using a virtual keyboard, small localization errors are more common than with physical keyboards. When using physical keyboards, the user typically relies on the tactile sensation of touching the keys as feedback indicating whether his or her fingers or thumb are in the right spatial location to carry out a desired keystroke. This is especially important when typing with multiple fingers as opposed to using single finger "hunt and peck" typing method. However, that tactile feedback is not available with a virtual keyboard. In preferred examples, an enhanced character prediction method is carried out and not only predicts which key the user is intending to depress but identifies it as the selected key. Thus, the key that is identified in a visual display will not necessarily exactly correspond to the physical coordinates of the actuating finger but may be based, at least in part, on the results of a character prediction algorithm.

Figure 11:
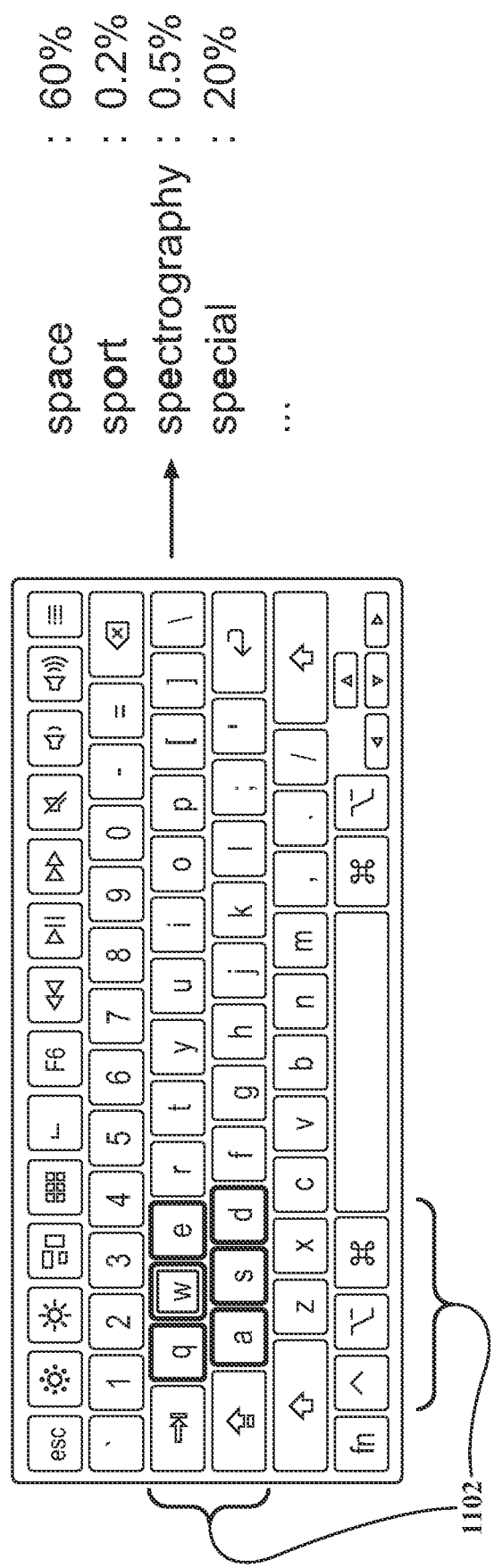
FIG. 11 shows a representation of the on-screen keyboard and the weighting function of selecting a key based on predictive text interpretation using a language-based model character prediction technique.

Therefore, in another embodiment, the disclosed system employs character prediction to aid in disambiguating estimated finger positions projected onto the on-screen keyboard 801. In one example, language-based character prediction is used. The language-based character prediction system predicts a next letter based on the language and the combinations of letters in that language that form words (or combinations of symbols such as Chinese or Japanese hanzi or kanji). The results of a language-based character prediction system are shown in FIG. 11, with a range of possible next characters 1102 and their respective probabilities 1101 of being the next character. The process is language-specific and biases the decision of selecting a key on the on-screen keyboard 801 based on the likelihood of a letter in the range of 1102 occurring after a previous letter has been selected. The chart 1101 shows an example of the data employed which was derived from empirical analysis of a language dictionary in service. In FIG. 11, the key the user has actually selected based on the location of his or her actuating finger is highlighted. However, in preferred examples, the highlighted key is based on character prediction so that if the user depresses the key, the corresponding keystroke will be carried out.

In preferred examples, the language-based character prediction method is used to obtain a first set of candidate next characters based on the currently-entered characters and the words in the language of interest that use those characters in the entered sequence or variants thereof. A known semantic technique is used to narrow the first set of candidate characters to a second set of candidate characters by evaluating the words that have been entered and the semantic meaning of new words formed with characters from the first set of characters.

In preferred examples, a trajectory-based character prediction model is then used to generate a third set of candidate next characters. In the trajectory-based model, the trajectory of a set of prior cursor positions is used to determine the probability that each of the keys is intended as the next key. The cursor positions (see FIG. 10 and cursor position 1001) will be positions that the method has determined are intended to be selected by the viewer and are limited to the key positions. A final candidate character is then determined based on the characters common to sets two and three, preferably by determining which key in the two sets has the highest combined probability of being selected. In certain examples, the individual probabilities of the two techniques are combined to arrive at the combined probability for each key.

The cursor is then automatically positioned over that final candidate character, and in certain examples, the key is selected (e.g., highlighted) and/or entered in the field of interest without user intervention. If the character is what the user intended, the user can continue typing or can hit "enter" to complete whatever operation is associated with the words being typed. If the character is not what was intended, the user can hit a backspace to remove the character from the field of interest (or to change the selected key highlighted on display 102) at which point character prediction is preferably temporality disabled so that the user can select the intended key based solely on the spatial position of the actuating finger. Once that selection is complete, character prediction may be re-enabled.

Although the use of both language-based and semantic-based techniques is preferred, in some examples only the language-based and trajectory-based techniques are used.

A method of operating a virtual keyboard will now be described with reference to FIG. 13A. In preferred examples, computer readable medium (RAM 1408 in FIG. 14) has computer executable instructions stored thereon which, when executed by CPU 1407 (FIG. 14) perform the steps of FIG. 13A.

In accordance with the method, an image data file index i and an actuation position image data file index j are both initialized. Step 1010. The image data file index i is then incremented. Step 1012. In step 1014, camera 101 captures an image data set (i) for the anatomy of a viewer sitting in front of display 102 and in the field of view of camera 101. In step 1015 the fingers and thumbs of the viewer are identified using a Pose Estimation and Gesture Recognition technique such as the open-source MediaPipe and BodyPix software described previously, and momentum smoothing is applied using equations (1)-(3) to remove jitter in the position X and velocity V vector data. Using the smoothed data, in step 1016 it is determined whether any of the viewer's fingers or thumb are in an actuation position. The captured and smoothed finger and thumb image data is used to determine if one of the user's hands has come to a rest position and whether there is a finger or thumb in an actuation position, if not, control transfers to step 1012 and another image data set is processed.

If step 1016 returns a value of YES, in step 1018 a set of temporally distinct values of position vector X(j) with 1 to $J_{max}$ elements is updated to that the set includes the newly read position data (x, y, z) and so data older than $J_{max}$ is discarded. This step ensures that only a certain number of image files in which actuation is occurring are stored for processing in the subsequent steps. The actuation position image data file index is set to 1 and the most recent image data file position data X(i) for each finger and thumb is stored in the 1st (j=1) element of the actuation position image data file X(j). The image data for the fingers and thumb are identified in step 1024 (or simply retrieved if they were stored in step 1016). After normalizing the magnitude of the displacement vector X(j) to the anatomical reference dimension, the vector is resolved into coordinates x(j), y(j), and z(j). These coordinates are then scaled to their respective full range motion calibration maximum values ($x_{max}$, $y_{max}$, $z_{max}$). Thus, in step 1026 the scaled position of each finger X(j)=($x_R(j)$, $y_R(j)$, $z_R(j)$) is determined. The scaling is performed in accordance with the following relationships:

$$x_R(j) = x(j)/x_{max} \quad (4)$$

$$y_R(j) = y(j)/y_{max} \quad (5)$$

$$z_R(j) = z(j)/z_{max} \quad (6)$$

wherein, $x_R(j)$, $y_R(j)$ and $z_R(j)$ are the scaled x-axis, y-axis, and z-axis coordinates respectively, of the finger or thumb of interest (dimensionless) and x(j), y(j), and z(j) are the distances of that finger or thumb from the coordinate origin (which is preferably the shoulder beam center point 605) in pixels or some other measure internal to the image data. Note that x(j), y(j), and z(j) are also dimensionless as the magnitude of the vector that defines them has been scaled to the anatomical reference dimension.

Each virtual key K(t) corresponds to a position having an index value t of 1 to N which is defined by a set of scaled position coordinates $x_{kt}$, $y_{kt}$, and $z_{kt}$ where the scaling is done based on $x_{max}$, $y_{max}$, and $z_{max}$ as described above. After determining which finger (or thumb) is actuating, in step 1028 the probability of the actuating finger actuating each key at the positions 1 to N is determined. If a finger is squarely over a virtual key location, the probability may be 100 percent for that key. However, in the absence of tactile feedback, it is likely that in many cases there will be an appreciable probability that more than one key could have been intended. Therefore, in the method of FIG. 13A, character prediction is used to determine the intended key in step 1026. The character prediction technique may be a known language based model character prediction technique. However, in step 1026 multiple techniques are used to arrive at a more reliable next character prediction. Language-based model character prediction is used to identify a first set of candidate next characters. In certain examples, a semantic-based prediction model is then to narrow the first set of candidate characters to a second set of candidate characters. Then, the trajectory-based model described previously is carried out to determine the probabilities that the user will next select each of the virtual keys based on the cursor trajectory over a specified number of previous positions.

In step 1030 if additional image data is being captured and is available, control transfers to step 1012 to process a new set of image data. Otherwise, the method ends.

Figure 13B:
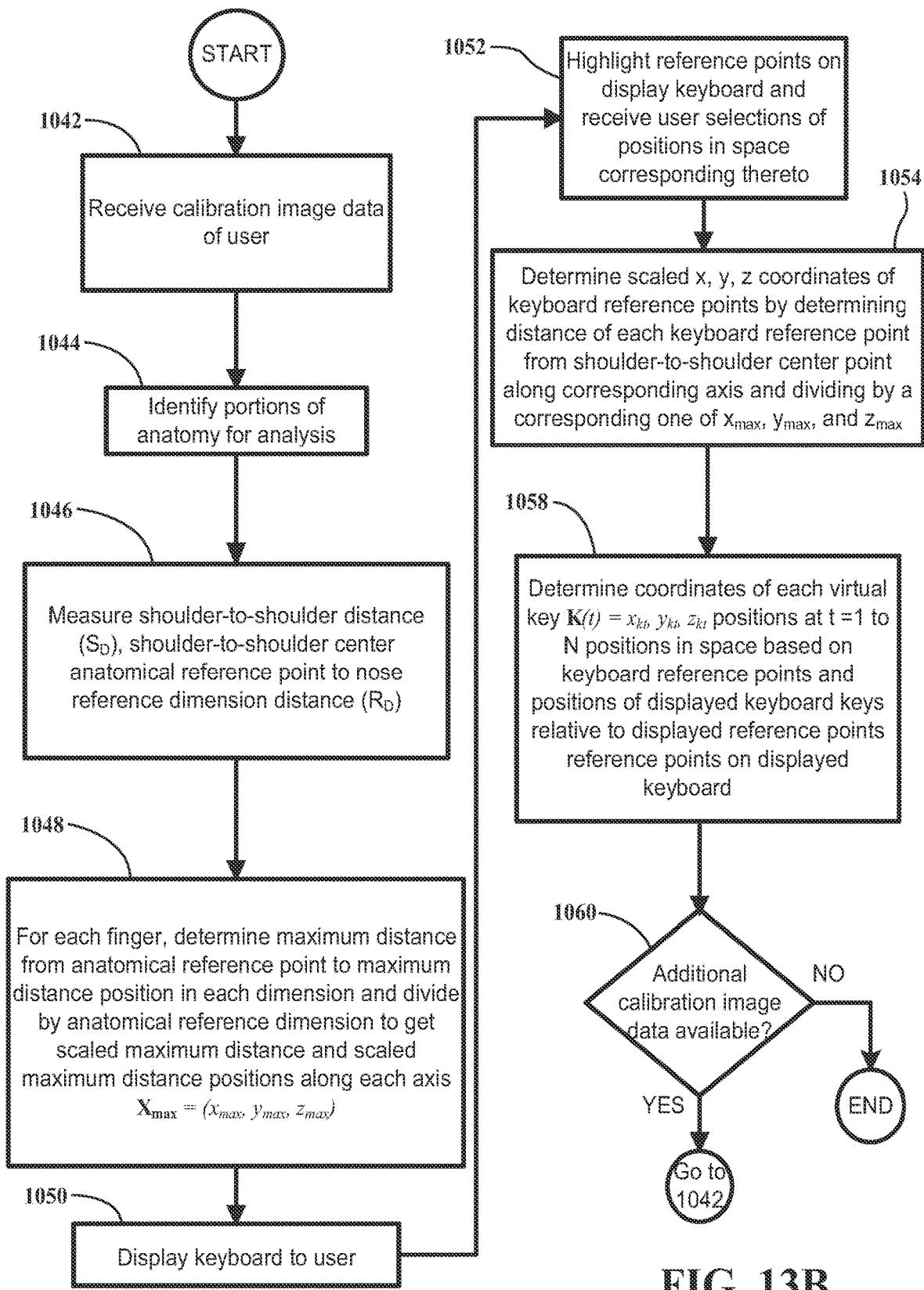
FIG. 13B is a flow chart depicting a method of providing a virtual keyboard dimensionally calibrated to a user's anatomy.

Referring to FIG. 13B, a method of providing a virtual keyboard is depicted. In preferred examples, computer readable medium (RAM 1408 in FIG. 14) has computer executable instructions stored thereon which, when executed by CPU 1407 (FIG. 14) perform the steps of FIG. 13B.

In accordance with the method, camera 101 captures calibration image data of the viewer in the form of a sequence of temporally distinct images. Step 1042. Using Pose Estimation and Gesture Recognition, areas of the anatomy required for subsequent analysis, such as the shoulders, nose, hands, arms, fingers, and thumbs are identified within the image data. Step 1044.

In step 1046 a series of anatomical dimensions are measured using the image data itself as a metric of measurement. For examples, distances may be determined based on numbers of pixels between two points. Using this technique, a shoulder beam width (SD) which is the distance between the shoulders is determined. From this, the center point 605 of the shoulder beam is determined, and the vertical distance from that location to the nose is determined (RD). RD will serve as the anatomical reference dimension, and all anatomical dimensions will be scaled with respect to it. Other scaled anatomical dimensions are also determined, including upper and fore arm lengths, finger and thumb lengths, hand lengths, etc.).

The maximum scaled distance of the user's range of motion in each direction is then determined in step 1048 by having the user place his or her hands at locations in space defining his or her range of motion along each axis x, y, and z. The unscaled distance in each dimension will be the distance from the anatomical reference point (e.g., shoulder beam center point 605) to the farthest fingertip or thumb location along the axis defining that dimension in pixels, which is then divided by the anatomical reference dimension to obtain the maximum the set of scaled (to the anatomical reference dimension) distances along each axis ($x_{max}$, $y_{max}$, $z_{max}$). The maximum scaled distance will in turn correspond to a position in space ("maximum distance position") at which one of the fingertips is furthest from the anatomical reference point (e.g., shoulder beam center point 605) at the user's full range of motion position. These "maximum distance positions" will define a 1.0 location on each (dimensionless) axis used to define the positions of the user's fingers and thumb and the positions of the virtual keys. The maximum distances are determined for each finger and thumb when the hands are placed at the outer limit of the range of motion. The farthest distance among all the fingers and as between both hands will be the maximum distance used to set the 1.0 location on the axis. Thus, $X_{max}=(x_{max}, y_{max}, z_{max})$ is the set of maximum distance positions which, along with the anatomical reference point, define the coordinate system used to locate virtual key and finger/thumb positions in three-dimensions. As indicated previously, $z_{max}$ may be determined from the user's known anatomical dimensions that were themselves determined in step 1046.

It should be noted that the user can define his or her range of motion simply by placing his or her hands at whatever location he or she wants to use to define it, and therefore, the range of motion may not be the actual physical range of motion of the user but may be something less than that. This gives the user the option of using a more comfortable range in which to execute virtual keystrokes.

In step 1050 an image of a keyboard is displayed on TV display 102. Reference locations on the keyboard are highlighted, and the user is directed to place a finger at a position in space which he or she wants to define as the highlighted portion of the keyboard. Step 1054. In certain examples, the reference locations are four corners of the keyboard as illustrated in FIG. 7B. Anatomical dimension calibration images of the user are captured by camera 101, and the coordinates of the points in space selected by the user are determined from the captured image data.

In step 1058 the coordinates of each virtual key $K(t)=x_{kt}$, $y_{kt}$, and $z_{kt}$ are determined by scaling the distances from anatomical reference point 605 to the viewer's fingertips along each axis when his or her hands are at their maximum range of motion positions (i.e., at $x_{max}$, $y_{max}$, $z_{max}$). With the reference location coordinates having been determined, the keyboard image displayed on the TV display 102 can be used to determine the virtual key coordinates by scaling the distances from the reference points to the virtual keys using the comparable dimensions of the displayed image.

In certain examples, as part of step 1058, during calibration the user may be asked to type in certain words or phrases and to then backspace and correct any mistakes. Thus, there will be an initial calibration virtual key assignment comprising a calibration keystroke and a corresponding calibration virtual key position. If the user types the words or phrases, and there is a mismatch between the character he intended to type and the one he did type, any corrected keystrokes he enters may be used to adjust the spatial mapping of the virtual keys so that the virtual key is now associated with the intended and corrected keystroke.

If no additional calibration images are available, in step 1060 the process ends. Otherwise, control transfers to step 1042 to process the additional calibration image data.

Figure 13C:
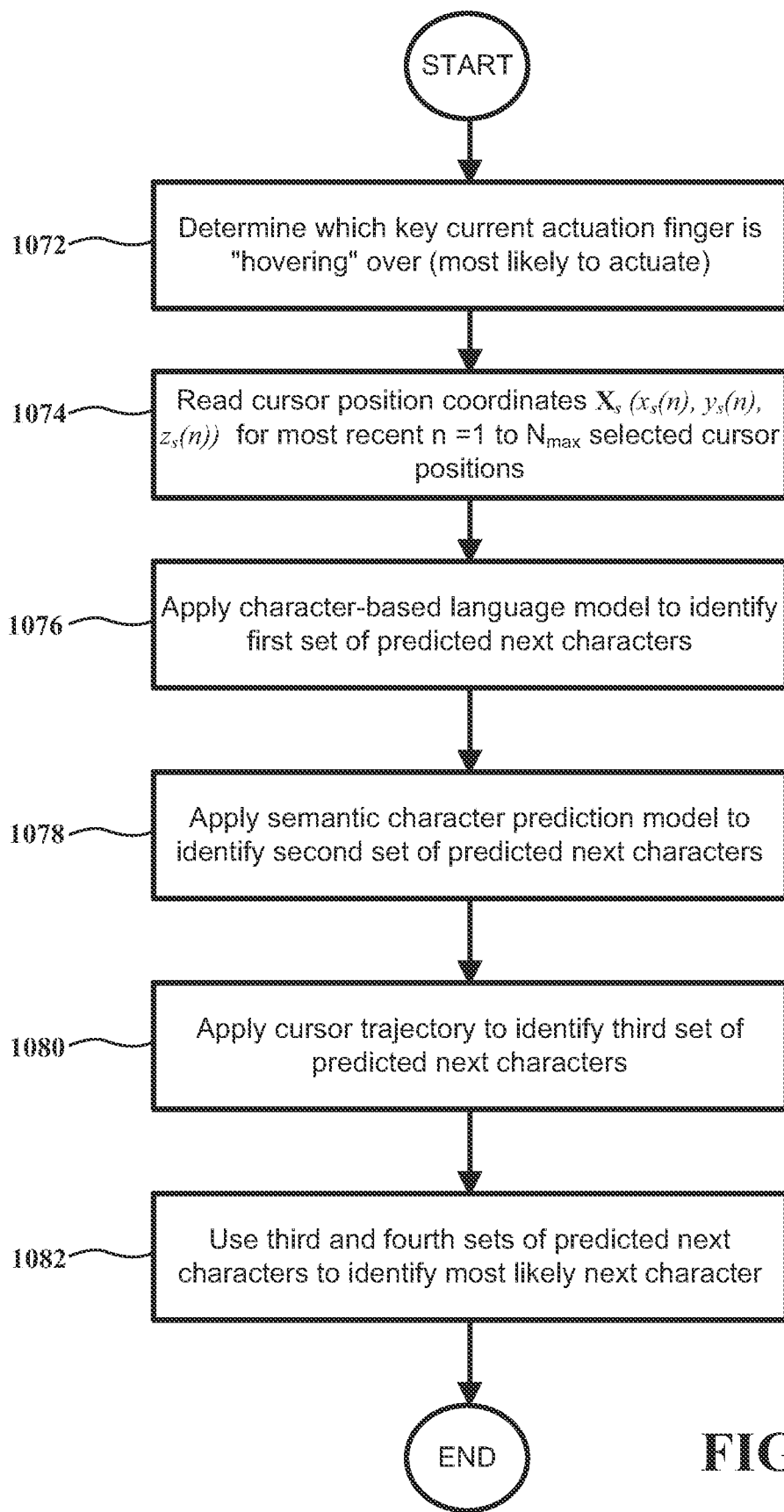
FIG. 13C is a flow chart depicting a method of predicting a next character to be entered by a user of a virtual keyboard.

As mentioned earlier, virtual keyboards lack the tactile feedback that physical keys can provide. Thus, small, localized errors are more common and can disrupt the user experience. In certain examples, the method of FIG. 13C is carried out to identify a next predicted character, display it on display 102 and then execute the corresponding keystroke to enter it in a field on the display. In preferred examples, the method of FIG. 13C is only carried out once a minimum specified number of sequential characters has been entered into a field. In preferred examples, the minimum number is no fewer than three and no greater than five characters. In the same or other preferred examples, computer readable medium (RAM 1408 in FIG. 14) has computer executable instructions stored thereon which, when executed by CPU 1407 (FIG. 14), perform the steps of FIG. 13C.

In step 1072 a next probable key stroke is identified based on the physical proximity of the viewer's actuating finger (the finger that is in a position indicative of actuating a key relative to the other fingers) to the virtual key locations in space. As there is no tactile feedback with the virtual keyboard, at any given time a viewer may have non-zero probability of actuating multiple keys.

The cursor positions $X_s(n)=(x_s(n), y_s(n), z_s(n))$ for the most recent 1 to $N_{max}$ cursor positions are then retrieved (read) from memory in step 1074. $N_{max}$ is generally from about 5 to about 20, preferably from about 7 to about 15, and more preferably from about 8 to about 12. The set of values of the vector Xs (n) defines a three-dimensional cursor trajectory on the virtual keyboard.

In step 1076 a known character-based language model is used to identify a first set of predicted characters. An example of this is shown in FIG. 11, in which a set of probabilities 1101 are provided for next characters a, o, and e. As indicated therein, the next character "e" has two probabilities associated with it based on its inclusion in two different words: "spectrography" and "special." The differing probabilities are based on the usage of the word in the English language, with "special" being used more frequently. To disambiguate the first set of predicted characters, in step 1078 a semantic character prediction model is applied in which the various possible words including the next predicted characters in the first set are evaluated for semantic coherence in connection with words previously entered in the field of interest. Therefore, to apply a semantic model, a number of previously entered words is stored in memory. In the case example of FIG. 11, the phrase "Documentaries about sp" has been entered. The semantic model will generate a second set of predicted next characters based on the likelihood of words including the characters of the first set following those that have already been entered. Suitable semantic character prediction models are known to those skilled in the art as are suitable character-based language models.

In accordance with the method, the cursor trajectories from step 1074 are used to determine a third set of predicted next characters. The cursor trajectories are used to produce a score increase for each character in the second set of predicted next characters from step 1078 that is both likely based on the semantic and character-based language models and in the path of the natural motion that the user was tracing with his or her keystrokes. The cursor position is then moved to the predicted key position on the display image of the keyboard on display 102 without user intervention, and in addition, the predicted key may be selected (e.g., highlighted) and/or entered without user intervention. If the cursor position, key selection and/or key entry are incorrect, the user can depress the virtual backspace key to temporarily disable character prediction and adjust the cursor position and/or key selection (or delete the entered character) without the intervention of character prediction. If the cursor position and/or key selection are correct, the user can then execute the keystroke by performing a key depression gesture. It has been found that this multiple mode approach to next character prediction facilitates faster and more accurate typing than any of the techniques alone. Although, in certain examples, the semantic model step 1078 may be omitted.

The processing system supporting the functionality of the smart TV system as disclosed herein, is illustrated in FIG. 14, which also includes other components which may be helpful in carrying out the methods described herein or enhancements thereof. The TV Processing System 1400 is shown in a block diagram in FIG. 14 wherein television signals are received either from a set-top box via HDMI input 1420 or by a TV Tuner 1421 or Internet Protocol video is received by an IP Tuner 1425 via Network Processor 1424 connected to a LAN via Wi-Fi or Ethernet. Additional information regarding the environment directly in front of the TV 100 is collected by one or more video camera systems 101 integrated into or associated with the TV 100. In FIG. 14, the system of the disclosure shows a block diagram providing the necessary functions of image reception, image manipulation (scaling, stitching, transforms, etc.), and software application (app) execution. The embodiment depicted in FIG. 14 is representative of a smart TV system and is provided for example only and is not intended to restrict the disclosure to this diagram.

The one or more instances of video camera 101 in combination with the camera processor 1402 associate with the smart TV system provides digital picture information to the processing system 1400 where the processing system is typically implemented as a system-on-a-chip (SOC) 1403 consisting of a CPU 1407, a Graphical Processing Unit (GPU) 1406, RAM 1408, permanent storage (e.g. flash memory) 1408, a video frame buffer 1405, a specialized AI processor 1423. AI processor 1423 can offload from the CPU 1407 certain tasks while computing the BodyPix machine learning processes (mostly dot products) and other necessary elements for use in a processor system of a smart TV. The camera information 1402*a* (video stream) of the disclosure may be processed by the Video Frame Processor 1411, and Video Decoder 1409 under the control of App Manager 1410 running in the memory of the SOC 1403 which processes the incoming camera video stream to act on the video information under the control of the application running in TV App<n> 1406. TV App<n> represents the "nth" app of a plurality of apps stored in the TV Processor System 1400 and executed by CPU 1407.

The TV App<n> 1406 may also be executing a video calling or conferencing application or executing an entertainment application such as a video "watch party" or otherwise processing video both incoming from the other end or ends of a video conference call as well as providing the network streaming to send the processed video of the Camera Processor 1402 through the Internet to the other parties of a multi-way video application. The App Manager 1410 may assist one or more TV Apps<n> 1406 in processing the video broadcasts received by the TV Tuner 1421 or the HDMI Input 1420 received from a set-top box, or video received over the Internet by IP Tuner 1425.

In all examples, the App Manager 1410 does, among other things, the processing of the composite video output of any TV Apps<n> 1406 that are currently active in memory so that the composite video picture involving local and remote video sources and whatever other elements such as graphic overlays generated by TV Apps<n> 1406 are scaled and positioned appropriate to the executing application or service. The methods described herein may be carried out by corresponding apps represented by App<n> 1406 as well.

The system of the disclosure identifies and track actions of users in front of the TV in real-time and in the background without the need for a user to request the service or even be aware of its presence, though the identification system can, of course, be disabled for any or all persons of a household.

Figure 15:
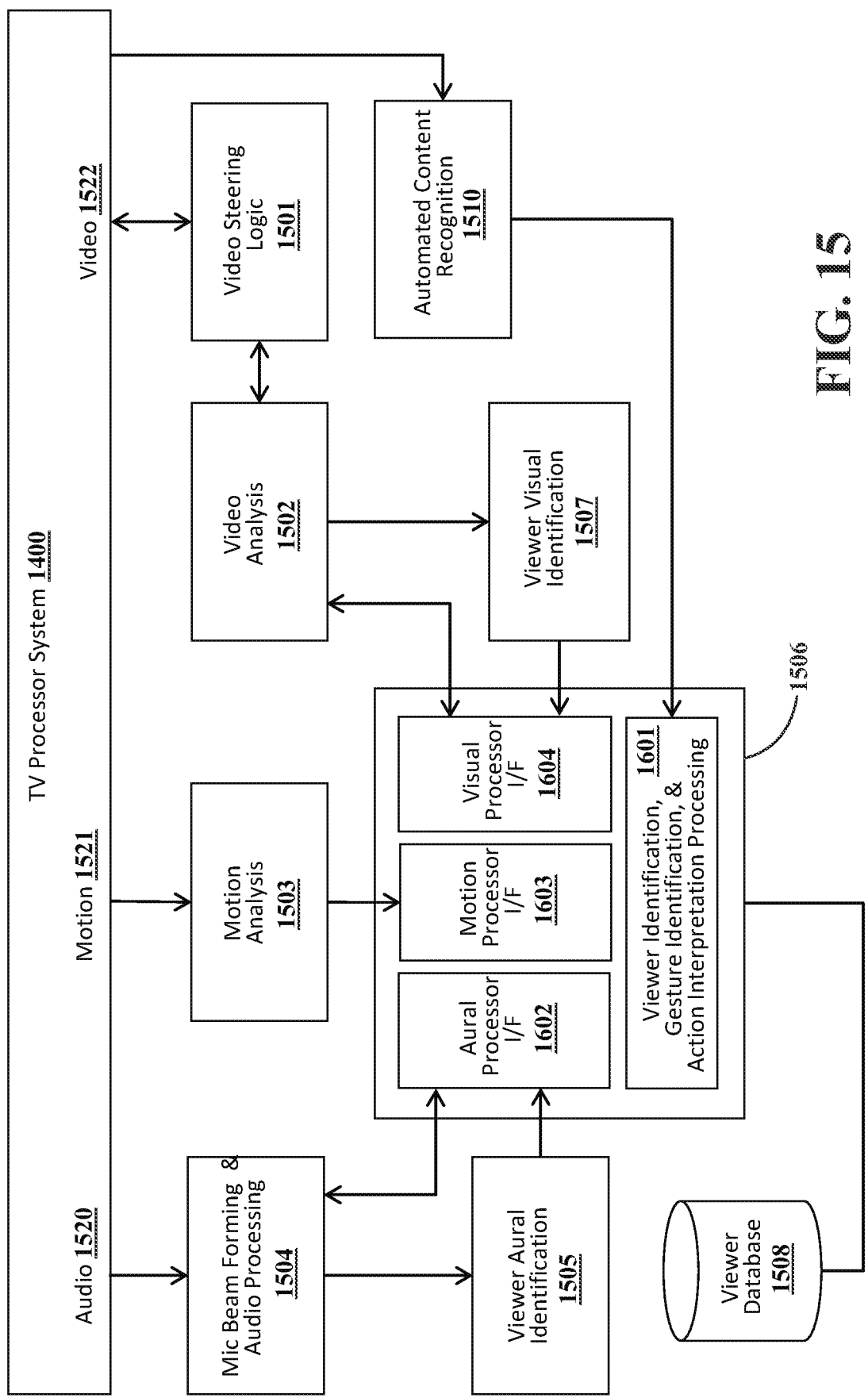
FIG. 15 is a block diagram of the processes of the system of the smart TV of FIG. 1 which carry out the methods of providing a virtual keyboard described herein.

In one embodiment, the system of FIG. 14 utilizes three inputs of audio, video, and motion data. The microphones 103*a* and 103*b* can be utilized and a beam-forming pair to allow the processes associated with the Automated Viewer Preferences Tracking process 1506 (FIG. 15) to direct the audio lobe (focus) in the area in front of the television to enhance the audio from one person and reject the audio from other sources around the person of interest. The artificial intelligence subsystem determines the most probable person upon whom to focus the microphone system by utilizing the visual detect system to locate the lip motions of a group to persons in range of the camera system 101 and determine which viewer in the presence of the TV is most likely speaking (or emitting a voice gesture.)

The speech recognition of the system occurs via the viewer aural identification process of 1505 which then provides user identification information to the Automated Viewer Preferences Tracking process 1506. Additional viewer identification occurs via Viewer Visual Identification 1507 which applies facial recognition technology well known to the skilled person. To best identify one or more viewers in the vicinity of the television system, Automated Viewer Preferences Tracking process 1506 may direct the Video Steering Logic 1501 to isolate a viewer from a group of viewers by employing AI Video Analysis 1502 in combination with Video Steering Logic to digitally zoom into and isolate a face from a group of many or from a complex background.

The Automated Viewer Preferences Tracking process 1506 also detects the arrival or departure of a viewer or group of viewers by means of motion sensor arrays 104*a* and 104*b* as part of the television apparatus bar 105 in proximity of the camera 101 and microphones 103*a* and 103*b*. When one or more viewers pass in front of the television, the motion sensor signal is sent to Motion Analysis process 1503 which detects the direction of travel across the two motion sensors and reports the information to the process 1506. The arrival or departure of viewers from the area in the vicinity of the television is analyzed by the Viewer Visual Identification process 1507 and provided to the process 1506.

The Viewer Visual Identification process 1507 provides viewer facial recognition service to the Viewer Identification, Gesture Identification, & Action Interpretation Processing 1601. The process 1507 utilizes a software image recognition process that receives video data from a camera mounted in or on a TV (e.g., camera 101) that has a visual range of the area in front of the TV 100 to process images of one or more persons sitting in front of and viewing the TV. An image database is created by an initialization process where each enrolled user is photographed in front of the TV and that picture information is analyzed and stored in an internal memory element 1408 to be accessed and used as a reference image for the identification system. In one embodiment, a machine learning-based program is utilized that may employ the AI processor 1423. The identification process of 1507 may, in one embodiment, utilize a convolutional neural network (CNN) that has been pre-trained to recognize human faces. Upon enrollment, household members' faces can be added to the recognition system as additions to the pre-trained model.

The Aural Processor Interface 1602 receives audio data from a Microphone Beam Forming & Audio Processing system 1504 for the purpose of applying audio data to 1601 for speech-recognition for command and control applications such as TV program guide searching and control of the TV functions, among other applications.

The Motion Processor Interface 1603 is another image processing function utilizing the machine learning processes of 1601 to interpret video images of a user in front of the TV making hand and/or finger gestures. The gestures are matched to pre-trained gestures in a machine learning (ML) database stored in the flash memory of the TV Processor System 1400. Likewise, the Visual Processor Interface 1604 is utilized to interpret, among other things, facial gestures by a similar ML process as employed by 1603.

What is claimed is:

1. A method of operating a virtual keyboard comprising a plurality of virtual keys, comprising:

normalizing keystroke motion vector data to obtain normalized keystroke motion vector data comprising distances of at least one user extremity at different points in time from a reference point on the user's anatomy relative to a reference anatomical dimension on the user's body;

determining a virtual keyboard keystroke from the normalized keystroke motion vector data;

executing a function corresponding to the virtual keyboard keystroke; and momentum smoothing the received user keystroke motion vector data to obtain a momentum-smoothed distance of the user extremity from the reference point on the user's anatomy.

2. The method of claim 1, where the step of momentum smoothing the received user keystroke motion vector is performed in accordance with the following relationships:

$$\partial \vec{X} = \vec{X}_i - \vec{X}_{i+1} \quad (a)$$

$$\partial \vec{V} = \beta \partial \vec{V} + (1 - \beta) \partial \vec{X} \quad (b)$$

$$\vec{X}_{i+1} = \vec{X}_i - \alpha \partial \vec{V} \quad (c)$$

wherein, $\vec{X}$=displacement vector (x, y, z) for the displacement of at least one user extremity from the anatomical reference point relative to the reference anatomical dimension along the corresponding axis;

$\vec{V}$=velocity vector ($v_x$, $v_y$, $v_z$);

β=inertial weight (scalar, dimensionless);

α=exponential smoothing value (scalar, dimensionless);

i=dimensionless index value for data points i=1 to a maximum value, $i_{max}$.

3. An interactive video display system comprising:
a video display;
a camera operable to capture images of at least one user extremity;
at least one computer processor;
at least one computer readable medium having non-transitory, computer executable instructions stored thereon, wherein when executed by the at least one computer processor, the computer executable instructions perform the method of claim 1.

4. A method of operating a virtual keyboard comprising a plurality of virtual keys, comprising:
normalizing keystroke motion vector data to obtain normalized keystroke motion vector data comprising distances of at least one user extremity at different points in time from a reference point on the user's anatomy relative to a reference anatomical dimension on the user's body;
determining a virtual keyboard keystroke from the normalized keystroke motion vector data; and
executing a function corresponding to the virtual keyboard keystroke,
wherein the step of determining a virtual keyboard keystroke from the keystroke motion vector data comprises comparing a resting position of the at least one user extremity from the user anatomical reference point to a plurality of virtual keyboard key positions relative to the user anatomical reference point and selecting a virtual key having a virtual key position relative to the user anatomical reference point which is closest to the resting position of the user extremity.

5. The method of claim 4, further comprising the step of determining the plurality of virtual keyboard key positions relative to the user anatomical reference, wherein the step of determining the plurality of virtual keyboard key positions relative to the user anatomical reference point comprises:
displaying an image of a keyboard comprising a plurality of display keys;
selecting a plurality of positions in space relative to the user's anatomical reference point, each of which define a corresponding reference location on the displayed keyboard;
determining a plurality of positions in space of each virtual key in a set of virtual keys comprising the selected virtual key;
determining the positions of the virtual keys in space based on the positions of the reference locations of the virtual keyboard in space relative to the user's anatomical reference point and the distances of the display keys from the reference locations on the displayed keyboard.

6. The method of claim 4, further comprising:
using a language-based character prediction model and a cursor trajectory prediction model to determine a next predicted character; and
displaying the next predicted character as a selected character.

7. The method of claim 6, wherein the step of using a language-based character prediction model comprises receiving a set of previously entered keystrokes and generating a first set of probabilities that the user will next select any of a first set of virtual keys.

8. The method of claim 7, wherein the step of using a cursor trajectory prediction model comprises determining a cursor trajectory from the set of previously entered key strokes and generating a second set of probabilities that the user's at least one extremity will come to rest on any of a second set of virtual keys, and the method further comprises selecting the next predicted character based on both the first and second probabilities.

9. An interactive video display system comprising:
a video display;
a camera operable to capture images of at least one user extremity;
at least one computer processor;
at least one computer readable medium having non-transitory, computer executable instructions stored thereon, wherein when executed by the at least one computer processor, the computer executable instructions perform the method of claim 6.

10. A method of operating a virtual keyboard comprising a plurality of virtual keys, comprising:
normalizing keystroke motion vector data to obtain normalized keystroke motion vector data comprising distances of at least one user extremity at different points in time from a reference point on the user's anatomy relative to a reference anatomical dimension on the user's body;
determining a virtual keyboard keystroke from the normalized keystroke motion vector data;
executing a function corresponding to the virtual keyboard keystroke;
capturing anatomical dimension calibration image data of a user;
calculating the reference anatomical dimension from the calibration image data;

calculating a plurality of anatomical dimensions of the user from the captured anatomical dimension calibration image data of the user; and determining a plurality of relative anatomical dimensions corresponding to each of the anatomical dimensions in the plurality of anatomical dimensions by dividing each anatomical dimension in the plurality of anatomical dimensions by the reference anatomical dimension.

11. The method of claim 10, wherein the step of normalizing keystroke motion vector data to obtain normalized keystroke motion vector data comprises:

determining a maximum distance of the at least one user extremity from the user anatomical reference point from the captured anatomical dimension calibration image data of the user;

dividing the maximum distance of the at least one user extremity from the user anatomical reference point by the reference anatomical dimension to obtain a normalized maximum distance of the at least one user extremity from the anatomical reference point;

receiving keystroke image data;

determining a maximum distance position of the at least one user extremity relative to the user's anatomical reference point from received keystroke image data; and determining a position of the at least one extremity relative to the anatomical reference point maximum distance position from the received keystroke image data and the determined maximum distance position of the at least one user extremity relative to the user's anatomical reference point.

12. The method of claim 11, wherein the maximum distance of the at least one user extremity from the user anatomical reference point is a maximum distance in a first direction along a first axis, the maximum distance position of the at least one user extremity relative to the anatomical reference point is a maximum distance position along the first axis, and the position of the at least one extremity relative to the anatomical reference point is a position along the first axis, the method further comprising:

determining a maximum distance of the at least one user extremity from the user anatomical reference point in a second direction along a second axis from the captured anatomical dimension calibration image data of the user;

determining a maximum distance position of the at least one user extremity relative to the user's anatomical reference point along the second axis from received keystroke image data;

determining a position of the at least one extremity relative to the maximum distance position of the at least one user extremity along the second axis from the received keystroke image data and the determined maximum distance position of the at least one user extremity relative to the user's anatomical reference point along the second axis.

13. A method of operating a virtual keyboard comprising a plurality of virtual keys, comprising:

normalizing keystroke motion vector data to obtain normalized keystroke motion vector data comprising distances of at least one user extremity at different points in time from a reference point on the user's anatomy relative to a reference anatomical dimension on the user's body;

determining a virtual keyboard keystroke from the normalized keystroke motion vector data;

executing a function corresponding to the virtual keyboard keystroke; and determining a normalized three-dimensional motion vector for the position of a user extremity in three-dimensions relative to a maximum distance position of the user extremity from the user's reference anatomical position in each of the three-dimensions.

14. A method of operating a virtual keyboard comprising a plurality of virtual keys, comprising:

normalizing keystroke motion vector data to obtain normalized keystroke motion vector data comprising distances of at least one user extremity at different points in time from a reference point on the user's anatomy relative to a reference anatomical dimension on the user's body;

determining a virtual keyboard keystroke from the normalized keystroke motion vector data;

executing a function corresponding to the virtual keyboard keystroke;

displaying a keyboard comprising a plurality of display keys each of which corresponds to one of a plurality of virtual key positions in space relative to the user's anatomical reference point;

receiving a calibration virtual key assignment comprising calibration virtual keystroke and a corresponding calibration virtual key position in space relative to the user's anatomical reference point;

receiving corrected keystroke data corresponding to the calibration virtual key position in space; and adjusting the calibration virtual key assignment so that the corrected keystroke data corresponds to the calibration virtual key position in space relative to the user's anatomical reference point.

* * * * *